(12) United States Patent
Kim et al.

(10) Patent No.: US 9,350,503 B2
(45) Date of Patent: May 24, 2016

(54) METHOD FOR TRANSCEIVING PREAMBLE IN WIRELESS ACCESS SYSTEM AND APPARATUS FOR SAME

(71) Applicant: LG ELECTRONICS INC., Seoul (KR)

(72) Inventors: Jinmin Kim, Anyang-si (KR); Seunghee Han, Anyang-si (KR); Hyukmin Son, Anyang-si (KR); Hyunwoo Lee, Anyang-si (KR); Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 14/354,523

(22) PCT Filed: Nov. 2, 2012

(86) PCT No.: PCT/KR2012/009166
§ 371 (c)(1),
(2) Date: Apr. 25, 2014

(87) PCT Pub. No.: WO2013/066099
PCT Pub. Date: May 10, 2013

(65) Prior Publication Data
US 2014/0301336 A1     Oct. 9, 2014

Related U.S. Application Data

(60) Provisional application No. 61/554,502, filed on Nov. 2, 2011.

(51) Int. Cl.
*H04W 4/00* (2009.01)
*H04L 5/00* (2006.01)
(Continued)

(52) U.S. Cl.
CPC .............. *H04L 5/003* (2013.01); *H04L 5/001* (2013.01); *H04L 5/0048* (2013.01); *H04L 27/2608* (2013.01); *H04W 74/08* (2013.01); *H04L 27/261* (2013.01)

(58) Field of Classification Search
CPC ..................................... H04W 28/04
USPC ......................................... 370/329
See application file for complete search history.

(56) References Cited

U.S. PATENT DOCUMENTS

2008/0069031 A1*   3/2008   Zhang et al. ............. 370/328
2009/0238064 A1*   9/2009   Lee et al. ................. 370/208
(Continued)

FOREIGN PATENT DOCUMENTS

KR   10-2010-0118952    11/2010
KR   10-2011-0043493    4/2011
(Continued)

OTHER PUBLICATIONS

NEC Group, "Additional Carrier Types: Extension Carrier," TSG-RAN WG1 #66bis, R1-113226, Oct. 2011, 4 pages.
(Continued)

*Primary Examiner* — Samina Choudhry
(74) *Attorney, Agent, or Firm* — Lee, Hong, Degerman, Kang & Waimey; Jonathan Kang; Richard Salfelder

(57) ABSTRACT

Disclosed are a method for transceiving a preamble in a wireless access system that supports a carrier aggregation/multi cells, and an apparatus for the same. More particularly, the method of the present invention comprises a step of transmitting a preamble to a terminal via an extension carrier that does not operate as a single carrier but operates only as a portion of a carrier aggregation. The preamble is generated based on a pseudo-random sequence.

16 Claims, 15 Drawing Sheets

(51) Int. Cl.
*H04L 27/26* (2006.01)
*H04W 74/08* (2009.01)

(56) References Cited

U.S. PATENT DOCUMENTS

2011/0149868 A1* 6/2011 Krishnamurthy et al. .... 370/328
2011/0170535 A1* 7/2011 Wang et al. ................... 370/350

FOREIGN PATENT DOCUMENTS

KR 10-2011-0050576 5/2011
KR 10-2011-0095823 8/2011
WO 2010/126316 11/2010

OTHER PUBLICATIONS

LG Electronics, "Additional Carrier Type for Rel-11," 3GPP TSG RAN WG1 Meeting #66bis, R1-113186, Oct. 2011, 5 pages.
European Patent Office Application Serial No. 12846411.2, Search Report dated Jun. 18, 2015, 7 pages.
PCT International Application No. PCT/KR2012/009166, Written Opinion of the International Searching Authority dated Mar. 19, 2013, 16 pages.

* cited by examiner

METHOD FOR TRANSCEIVING PREAMBLE IN WIRELESS ACCESS SYSTEM AND APPARATUS FOR SAME

CROSS-REFERENCE TO RELATED APPLICATIONS

This application is the National Stage filing under 35 U.S.C. 371 of International Application No. PCT/KR2012/009166, filed on Nov. 2, 2012, which claims the benefit of U.S. Provisional Application Ser. No. 61/554,502, filed on Nov. 2, 2011, the contents of which are all hereby incorporated by reference herein in their entirety.

TECHNICAL FIELD

The present invention relates to a wireless access system, and more particularly, to a method for transmitting and receiving a preamble in a wireless access system that supports carrier aggregation, and a device for supporting the method.

BACKGROUND ART

One of most important requirements of a next generation wireless access system is to support high data transmission rate requirements. To this end, various technologies such as multiple input multiple output (MIMO), cooperative multiple point transmission (CoMP), a relay, etc. have been developed.

A conventional wireless access system considers only one carrier although frequency bandwidths in uplink and downlink are set in different ways. For example, there is provided a wireless communication system in which the number of carriers included in each of uplink and downlink is one and bandwidths in uplink and downlink are generally symmetric, based on a single carrier.

However, in order to satisfy relatively high data transmission rate requirements to ensure a widebandwidth in consideration of an actual state in which frequency resources are saturated, the system is designed to satisfy basic requirements for operating independent systems in distributed bands and carrier aggregation (CA)/multiple cells whereby a plurality of bands is bonded to one system has been introduced.

Here, a carrier in a bandwidth unit in which independent operations are available may be referred to as a component carrier (CC). In order to increase transmission capacity, recent 3GPP LTE-A or 802.16m has continuously extended up to 20 MHz or more. In this case, one or more CCs are aggregated to support a wideband. For example, when one CC supports a bandwidth of 5 MHz, 10 MHz, or 20 MHz, a maximum of 5 CCs are bonded to support a system bandwidth up to a maximum of 100 MHz.

DISCLOSURE

Technical Problem

An object of the present invention devised to solve the problem lies in a wireless access system, and preferably, a method and apparatus for transmitting and receiving each preamble between a base station and a user equipment in a wireless access system that supports carrier aggregation.

Another object of the present invention devised to solve the problem lies in a method and apparatus for smooth timing synchronization in an extension carrier that can be operated as only a part of carrier aggregation.

In addition, another object of the present invention devised to solve the problem lies in a method and apparatus for smooth auto gain control (AGC) in an extension carrier that can be operated as only a part of carrier aggregation.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a preamble in a wireless access system for supporting carrier aggregation, the method including transmitting the preamble to a user equipment (UE) through an extension carrier that does not operate as a single carrier but operates only as a part of carrier aggregation, wherein the preamble is generated based on a pseudo-random sequence.

In another aspect of the present invention, provided herein is a base station (BS) for transmitting a preamble in a wireless access system for supporting carrier aggregation, the BS including a radio frequency (RF) unit for transmitting and receiving a radio signal; and a processor for transmitting the preamble to a user equipment (UE) through an extension carrier that does not operate as a single carrier but operates only as a part of carrier aggregation, wherein the preamble is generated based on a pseudo-random sequence.

In another aspect of the present invention, provided herein is a method of receiving a preamble in a wireless access system for supporting carrier aggregation, the method including receiving the preamble from a base station (BS) through an extension carrier that does not operate as a single carrier but operates only as a part of carrier aggregation, wherein the preamble is generated based on a pseudo-random sequence.

In another aspect of the present invention, provided herein is a user equipment (UE) for receiving a preamble in a wireless access system for supporting carrier aggregation, the UE including a radio frequency (RF) unit for transmitting and receiving a radio signal; and a processor for receiving the preamble from a base station (BS) through an extension carrier that does not operate as a single carrier but operates only as a part of carrier aggregation, wherein the preamble is generated based on a pseudo-random sequence.

The preamble may be mapped to one orthogonal frequency division multiplexing (OFDM) symbol in every a radio frame.

The OFDM symbol may be configured via higher layer signaling.

The OFDM symbol may be determined based on a cell ID.

The preamble may be mapped with the same mapping structure as a mapping structure of a positioning reference signal (PRS) in a predetermined subframe in a radio frame.

Period and offset information of a subframe in which the preamble is mapped may be configured via higher layer signaling.

Data transmitted to the UE may be punctured at a position of a resource element to which the preamble is mapped or may be rate-matched in consideration of the number of resource elements to which the preamble is mapped.

Advantageous Effects

According to embodiments of the present invention, a preamble between a base station and user equipment in a wireless access system, particularly, in a wireless access system for supporting carrier aggregation.

According to embodiments of the present invention, timing synchronization may be smoothly performed by transmitting and receiving a preamble in an extension carrier that can be operated as only a part of carrier aggregation.

In addition, according to embodiments of the present invention, auto gain control (AGC) may be smoothly performed by transmitting and receiving a preamble in an extension carrier that can be operated as only a part of carrier aggregation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
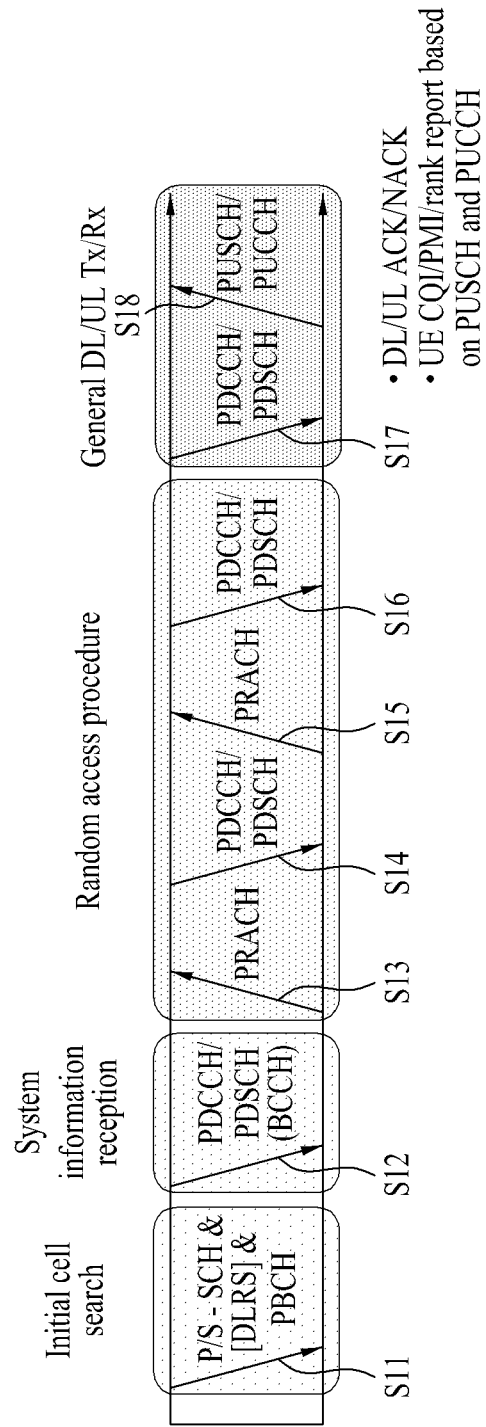
FIG. 1 is a diagram for explanation of physical channels and a general method for transmitting signals on the physical channels in a 3rd generation partnership project (3GPP) long term evolution (LTE) system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS), a subscriber station (SS), an advanced mobile station (AMS), a wireless terminal (WT), a Machine-Type Communication (MTC) device, a machine-to-machine (M2M) device, a device-to-device (D2D) device, etc.

It should be noted that specific terms disclosed in the present invention are proposed for convenience of description and better understanding of the present invention, and the use of these specific terms may be changed to other formats within the technical scope or spirit of the present invention.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16

(WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE/LTE-A. However, technical features of the present invention are not limited thereto.

1. GPP LTE/LTE-a System to which the Present Invention is Applied 1. 1. Overview of System FIG. 1 is a diagram for explanation of physical channels and a general method for transmitting signals on the physical channels in a 3GPP LTE system.

When a UE is powered on or enters a new cell, the UE performs initial cell search (S11). The initial cell search involves acquisition of synchronization to a base station (BS). To this end, the UE synchronizes its timing to the BS and acquires a cell identifier (ID) and other information by receiving a primary synchronization channel (P-SCH) and a secondary synchronization channel (S-SCH) from the BS.

Then the UE may acquire information broadcast in the cell by receiving a physical broadcast channel (PBCH) from the BS. During the initial cell search, the UE may monitor a downlink channel state by receiving a downlink reference signal (DL RS).

After the initial cell search, the UE may acquire detailed system information by receiving a physical downlink control channel (PDCCH) and a physical downlink shared channel (PDSCH) based on information included in the PDCCH in S12.

In order to complete access to the BS, the UE may perform a random access procedure with the BS (S13 to S16). In the random access procedure, the UE may transmit a preamble on a physical random access channel (PRACH) (S13), and may receive a response message to the preamble on a PDCCH and a PDSCH corresponding to the PDCCH (S14). In case of a contention-based RACH, the UE may additionally perform a contention resolution procedure such as transmission (S15) of an additional PRACH signal and reception (S16) of a PDCCH signal and a PDSCH corresponding to the PDCCH signal.

After the above procedure, the UE may receive a PDCCH and/or a PDSCH from the BS (S17) and transmit a physical uplink shared channel (PUSCH) and/or a physical uplink control channel (PUCCH) to the BS (S18), which is a general downlink and uplink signal transmission procedure.

Control information that the UE transmits to the BS is called uplink control information (UCI). The UCI includes hybrid automatic repeat and request acknowledgement/negative-ack (HARQ-ACK/NACK), scheduling request (SR), channel quality indication (CQI), precoding matrix indication (PMI), Rank Indication (RI) information, etc.

In an LTE system, in general, the UCI is periodically transmitted through a PUCCH. However, in order to simultaneously transmit control information and traffic data, the UCI may be transmitted through a PUSCH. In addition, the UCI may be aperiodically transmitted through a PUSCH according to a request/command of a network.

Figure 2:
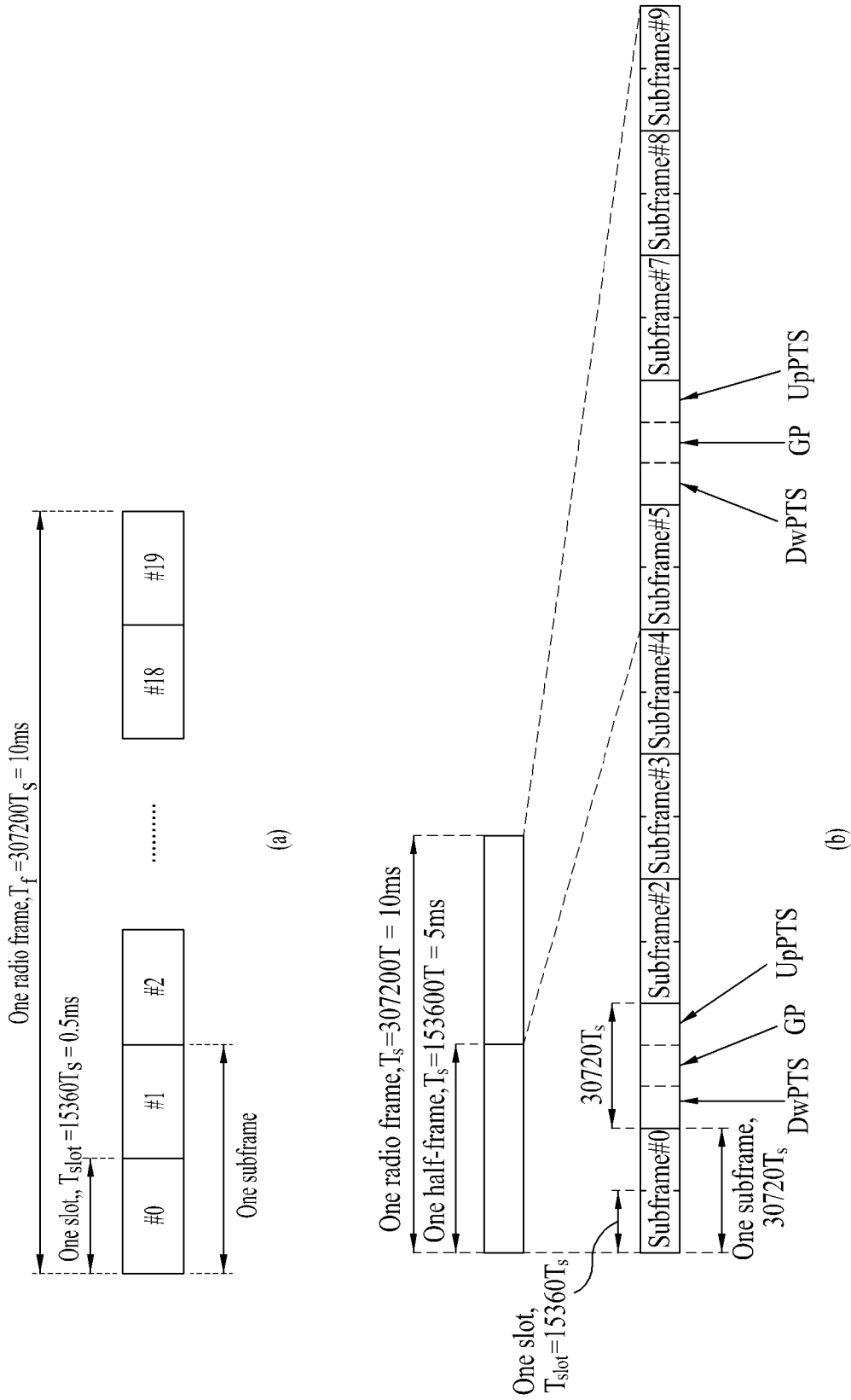
FIG. 2 is a diagram illustrating a structure of a radio frame used in a 3GPP LTE.

FIG. 2 is a diagram illustrating a structure of a radio frame used in a 3GPP LTE.

FIG. 2(a) illustrates a frame structure type 1. The frame structure type 1 may be applied to both a full duplex frequency division duplex (FDD) system and a half duplex FDD system.

One radio frame has a length of $T_f=307200 \cdot T_s=10$ ms and a uniform length of $T_{slot}=15360 \cdot T_s=0.5$ ms. Each radio frame is divided into 20 slots with indexes of 0 to 19. One subframe is defined as two contiguous slots and an ith subframe includes slots corresponding to 2i and 2i+1. That is, a radio frame includes ten subframes. Time for transmission of one subframe is referred to as a transmission time interval (TTI). Here, Ts denotes sampling time and is represented by $Ts=1/(15 \text{ kHz} \times 2048)=3.2552 \times 10^{-8}$ (about 33 ns). A slot includes a plurality of OFDM symbols or SC-FDMA symbols in a time domain and includes a plurality of resources block in a frequency domain.

One slot includes a plurality of orthogonal frequency division multiplexing (OFDM) symbols in a time domain. A 3GPP LTE uses the OFDMA in downlink and thus the OFDM symbol is used to represent one symbol period. The OFDM symbol may be referred to as one SC-FDMA symbol or symbol period. A resource block is a resource allocation unit and includes a plurality of contiguous subcarriers in one slot.

In the full duplex FDD system, ten subframes may be simultaneously used for downlink transmission and uplink transmission during each period of 10 ms. In this case, uplink and downlink transmission are separated in a frequency domain. On the other hand, in the half duplex FDD system, a UE cannot simultaneously perform transmission and reception.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. In this case, a maximum of the first three OFDM symbols of each subframe may be allocated to a physical downlink control channel (PDCCH) and the other OFDM symbols may be allocated to a physical downlink shared channel (PDSCH).

The aforementioned structure of the radio frame is purely exemplary and thus the number of subframes included in the radio frame, the number of slots included in a subframe, or the number of OFDM symbols included in a slot may be changed in various ways.

FIG. 2(b) illustrates a frame structure type 2. The frame structure type 2 may be applied to a TDD system. One radio frame has a length of $T_f=307200 \cdot T_s=10$ ms and two half frames having a length of $153600 \cdot T_s=5$ ms. Each half frame includes five subframes having a length of $30720 \cdot T_s=1$. An ith subframe includes two slots with a length of $T_{slot}=15360 \cdot T_s=0.5$ ms corresponding to 2i to 2i+1. Here, Ts denotes sampling time and is represented by $Ts=1/(15 \text{ kHz} \times 2048)=3.2552 \times 10^{-8}$ (about 33 ns).

The frame structure type 2 includes a special subframe including three fields of a downlink pilot time slot (DwPTS), guard period (GP), and uplink pilot time slot (UpPTS). Here, the DwPTS is used for initial cell search, synchronization or channel estimation at user equipment (UE). The UpPTS is used to synchronize channel estimation at the base station with uplink transmission of the UE. The GP is to remove interference occurring in uplink due to multipath delay of downlink signals between uplink and downlink.

Table 1 below shows a special frame configuration (length of DwPTS/GP/UpPTS).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
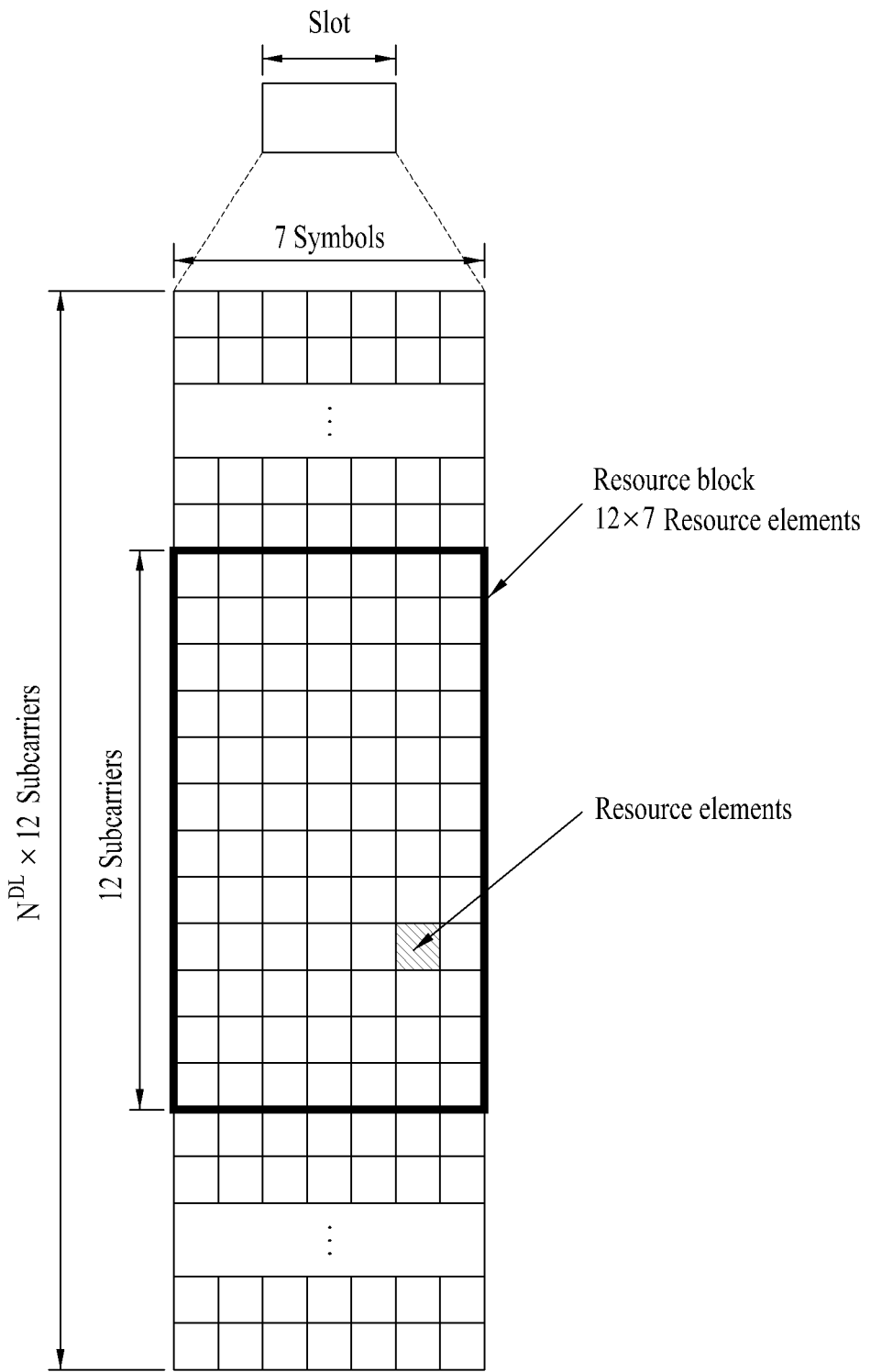
FIG. 3 is a diagram illustrating an example of a resource grid of a downlink slot.

FIG. 3 is a diagram illustrating an example of a resource grid of a downlink slot. Referring to FIG. 3, one downlink slot includes a plurality of OFDM symbols in a time domain. Here, a downlink slot includes 7 OFDM symbols in a time domain and a resource block (RB) includes 12 subcarriers in a frequency domain, which does not limit the scope and spirit of the present invention.

Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 4:
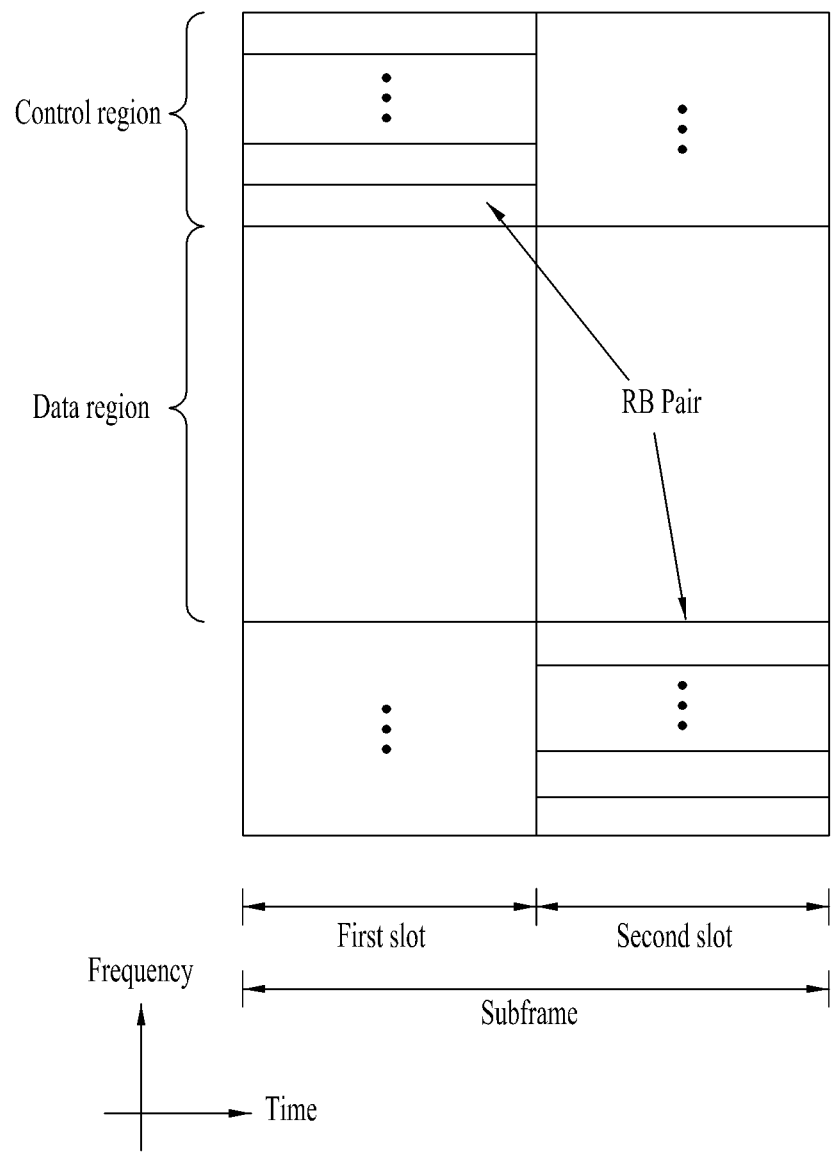
FIG. 4 is a diagram illustrating a structure of an uplink subframe.

FIG. 4 is a diagram illustrating a structure of an uplink subframe.

Referring to FIG. 4, the uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 5:
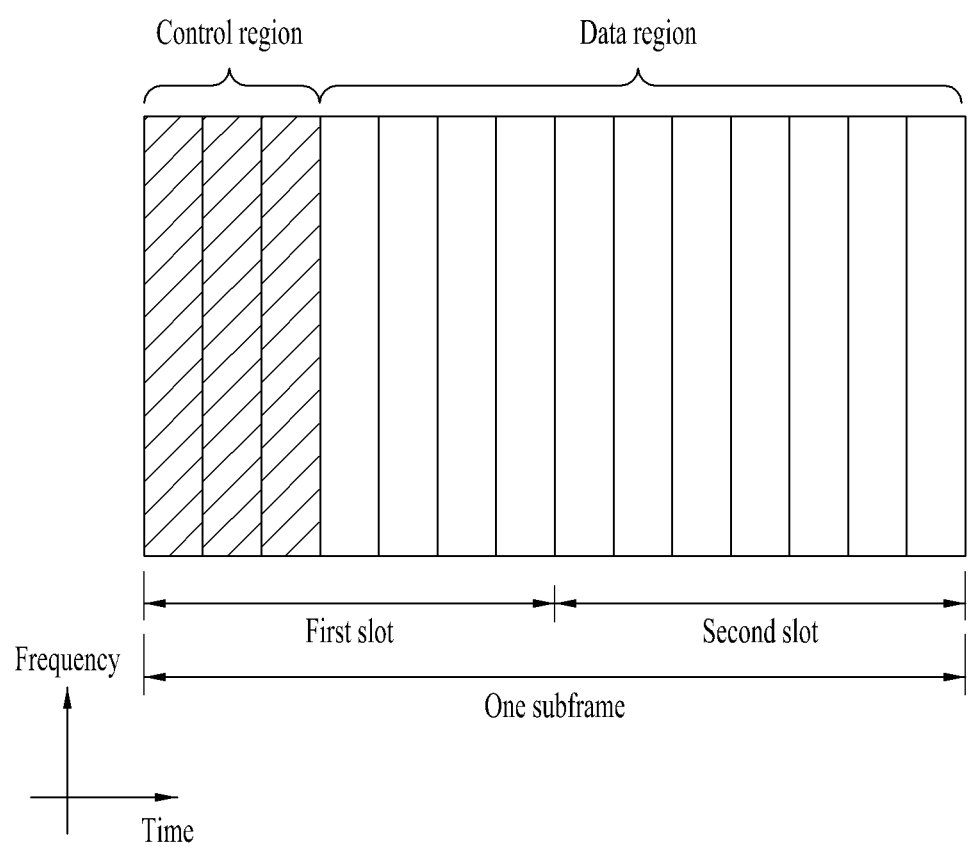
FIG. 5 is a diagram illustrating a structure of a downlink subframe.

FIG. 5 is a diagram illustrating a structure of a downlink subframe.

Referring to FIG. 5, a maximum of 3 OFDM symbols at the start of the first slot in the subframe are used for a control region to which control channels are allocated and the other OFDM symbols of the downlink subframe are used for a data region to which a PDSCH is allocated. Downlink control channels used in the 3GPP LTE system include, for example, a physical control format indicator channel (PCFICH), a physical downlink control channel (PDCCH), and a physical hybrid automatic repeat request (HARQ) indicator channel (PHICH).

The PCFICH is transmitted in the first OFDM symbol of a subframe, carrying information (that is, area of control region) about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink allocation information, or uplink transmission (Tx) power control commands for UE groups.

1. 2. Uplink/Downlink Scheduling in TDD System 1. 2. 1. Uplink-Downlink Configuration in TDD System An uplink-downlink configuration in a type 2 frame structure refers to a rule under which all subframes are allocated (reserved) for downlink and downlink. Table 2 shows an exemplary uplink-downlink configuration in a TDD system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, for each subframe in a radio frame, "D" denotes a subframe for downlink transmission, "U" denotes a subframe for uplink transmission, and "S" denotes a special subframe with three fields DwPTS, GP, and UpPTS. The uplink-downlink configuration may be classified into 7 types. The configurations may have different positions or numbers of downlink subframes, special frames, and uplink subframes.

A point of time for conversion into uplink from downlink or a point of time for conversion into downlink from uplink is referred to as a switching point. Switch-point periodicity refers to a period at which conversion between uplink and downlink subframes is repeated in the same way. In addition, uplink-downlink configurations with both 5 ms and 10 ms are supported. In the case of 5 ms downlink-uplink switch-point periodicity, the special subframe S exists every half frame. In the case of 5 ms downlink-uplink switch-point periodicity, the special subframe exists in the first half frame only.

For all configurations, 0th and 5th subframes and DwPTS are reserved for downlink transmission. UpPTS and the subframe immediately following the special subframe are always reserved for uplink transmission.

The uplink-downlink configurations may be system information and may be known to both a BS and a UE. The BS may notify the UE of information about change in an uplink-downlink allocation state of a radio frame by transmitting only an index of configuration information whenever uplink-downlink configuration information is changed. In addition, the configuration information may be transmitted as a type of downlink control information through a PDCCH as a downlink control channel like different scheduling information, and may be commonly transmitted as broadcast information to all UEs in a cell through a broadcast channel. In the TDD system, the number of half frames included in a radio frame, the number of subframes included in a half frame, and a combination of a downlink subframe and an uplink subframe are purely exemplary.

1. 2. 2. Uplink/Downlink Transmission Timing in TDD System

In the case of the frame structure type 1, when a UE receives a PHICH including an HARQ-ACK/NACK from a BS in an $i^{th}$ downlink subframe, the corresponding PHICH is associated with a PUSCH transmitted in an $(i-4)^{th}$ uplink subframe.

In more detail, upon receiving UL grant in an $n^{th}$ downlink subframe, a specific UE transmits a PUSCH in a corresponding $(n+4)^{th}$ uplink subframe. In addition, when a PUSCH is transmitted in the $(n+4)^{th}$ uplink subframe, a PHICH as an ACK/NACK response to the corresponding PUSCH in a corresponding $(n+8)^{th}$ downlink subframe is transmitted from the BS. That is, the UE that transmits the PUSCH in the $(n+4)^{th}$ uplink subframe may expect that a PHICH response to the PUSCH that is transmitted from the UE in an $(n+8)^{th}$ downlink subframe is transmitted from the BS and needs to search/detect/demodulate the PHICH.

On the other hand, in the case of the frame structure type 2, downlink/uplink subframe configurations are different for each respective uplink-downlink configuration, and thus, time for transmission of a PUSCH and PHICH may be differently configured according to configuration and time for transmission of a PUSCH and PHICH may be differently configured according to an index (number) of a subframe.

In an LTE system, an uplink/downlink timing relationship between a PUSCH and a PDCCH preceding the PUSCH, and a PHICH for transmitting a downlink HARQ ACK/NACK corresponding to the PUSCH is predetermined Table 3 below shows a transmission timing relationship between a PUSCH and a PHICH corresponding to the PUSCH for each uplink-downlink configuration.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 |   |   |   | 7 | 4 |   |   |   |
| 1 |   | 4 |   |   | 6 |   |   | 4 |   | 6 |
| 2 |   |   |   | 6 |   |   |   |   | 6 |   |
| 3 | 6 |   |   |   |   |   |   | 6 | 6 |   |
| 4 |   |   |   |   | 6 |   |   |   | 6 | 6 |
| 5 |   |   |   |   |   |   |   |   | 6 |   |
| 6 | 6 | 4 |   |   |   |   | 7 | 4 |   | 6 |

In cases of uplink-downlink configurations 1 to 6, when a UE receives a PHICH including an HARQ-ACK/NACK in an $i^{th}$ downlink subframe from a BS, the corresponding PHICH is associated with a PUSCH transmitted in an $(i-k)^{th}$ uplink subframe by the UE. In this case, k is defined in Table 3 above.

In the case of uplink-downlink configuration 0, an HARQ-ACK received through a PHICH in a resource corresponding to $I_{PHICH}=0$ allocated to a UE in an $i^{th}$ subframe is associated with a PUSCH transmitted in an $(i-k)^{th}$ subframe by the UE. On the other hand, an HARQ-ACK received through a PHICH in a resource corresponding to $I_{PHICH}=1$ allocated to the UE in an $i^{th}$ subframe is associated with a PUSCH transmitted in an $(i-6)^{th}$ subframe by the UE.

Table 4 below shows a transmission timing relationship between a PUSCH and a PHICH corresponding to the PUSCH for each uplink-downlink configuration.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 |   |   |   | 4 | 7 | 6 |   |   | 4 | 7 | 6 |
| 1 |   |   |   | 4 | 6 |   |   |   | 4 | 6 |   |
| 2 |   |   | 6 |   |   |   |   | 6 |   |   |
| 3 |   |   |   | 6 | 6 | 6 |   |   |   |   |
| 4 |   |   |   | 6 | 6 |   |   |   |   |   |
| 5 |   |   |   | 6 |   |   |   |   |   |   |
| 6 |   |   |   | 4 | 6 | 6 |   |   | 4 | 7 |   |

In response to PUSCH transmission being scheduled from a serving cell in an $n^{th}$ uplink subframe, a UE receives a PHICH (or an ACK/NACK response) for the corresponding uplink transmission in an $(n+k_{PHICH})^{th}$ downlink subframe from a BS. The UE may expect that an PHICH response to a PUSCH that is transmitted in an $(n+k_{PHICH})^{th}$ downlink subframe by the UE is transmitted from the BS and needs to search/detect/demodulate the corresponding PHICH. In the case of a FDD system, $k_{PHICH}$ has always 4, but in the case of a TDD system, $k_{PHICH}$ is defined in Table 4 above. In the case of a subframe bundling operation, the corresponding PHICH resource is associated a last subframe in a bundle.

Hereinafter, a procedure for transmitting a PUSCH by a UE will be described.

In an FDD system, for a normal HARQ operation, upon detecting a PDCCH and/or a PHICH with a DCI format 0 or 4 in an $n^{th}$ subframe from a serving cell, the UE transmits the corresponding PUSCH in an $(n+4)^{th}$ subframe according to the PDCCH and PHICH information.

In the case of uplink spatial multiplexing, when the UE detects PHICH transmission in an nth subframe and does not detect a PDCCH with DCI format 4, the UE re-transmits the corresponding PUSCH in an $(n+4)^{th}$ subframe according to the PHICH information. In this case, when the number of negatively acknowledged transport blocks is equal to the number of transport blocks indicated in the most recent PDCCH associated with the corresponding PUSCH, the UE re-transmits the corresponding PUSCH using the number of transmission layers and a precoding matrix according to the most recent PDCCH. On the other hand, when the number of negatively acknowledged transport blocks is not equal to the number of transport blocks indicated in the most recent PDCCH associated with the corresponding PUSCH, the UE re-transmits the corresponding PUSCH using a precoding matrix according to a codebook index 0 and the number of transmission layers, the number of which is equal to the number of layers corresponding to the negatively acknowledged transport blocks in the most recent PDCCH.

In an FDD system, in the case of a subframe bundling operation, upon detecting a PDCCH with a DCI format 0 in an $n^{th}$ subframe and/or a PHICH in an $(n-5)^{th}$ subframe, the UE transmits the corresponding first PUSCH in a bundle in an $(n+4)^{th}$ according to the PDCCH and PHICH information.

Table. 5 shows a transmission timing of a PDCCH and a PUSCH corresponding to the PDCCH for each uplink-downlink configuration.

TABLE 5

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | | | 4 | | | | 4 | |
| 1 | | | | | 6 | | | | 6 | |
| 2 | | | 6 | | 4 | | | | 6 | 4 |
| 3 | 4 | | | 4 | | | | | 4 | 4 |
| 4 | | | | | | | | | 4 | 4 |
| 5 | | | | | | | | | 4 | |
| 6 | 7 | 7 | | | | 7 | 7 | | | 5 |

Table 6 shows a transmission timing of a PDCCH and a PUSCH corresponding to the PDCCH for uplink-down configurations 0, 1, and 6.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | | 9 | 6 | | |
| 1 | | | 2 | | 3 | | | 2 | | 3 |
| 6 | | 5 | 5 | | | | 6 | 6 | | 8 |

In a TDD system, in the case of uplink-downlink configurations 1 to 6 and a normal HARQ operation, upon detecting a PDCCH and/or PHICH with an uplink DCI format in an $n^{th}$ subframe, the UE transmits the corresponding PUSCH in an $(n+k)^{th}$ subframe according to the PDCCH and PHICH information. In this case, k is defined in Table 5 above.

In the case of an uplink-downlink configuration 0 and a normal HARQ operation, upon detecting a PDCCH and/or PHICH with an uplink DCI format in an $n^{th}$ subframe, if a most significant bit (MSB) of an uplink index in a PDCCH with an uplink DCI format is set to 1 or the PHICH is received in a subframe n=0 or 5 in a resource corresponding to $I_{PHICH}=0$, the UE transmits the corresponding PUSCH in an $(n+k)^{th}$ subframe according to the PDCCH and PHICH information. In this case, k is defined in Table 5 above.

On the other hand, in the case of an uplink-downlink configuration 0 and a normal HARQ operation, when a least significant bit (LSB) of an uplink index in a DCI format 0 or 4 is set to 1 in an $n^{th}$ subframe, a PHICH is received in a subframe n=0 or 5 in a resource corresponding to $I_{PHICH}=1$, or the PHICH is received in a subframe n=1 or 6, the UE transmits the corresponding PUSCH in an $(n+7)^{th}$ subframe.

In the case of an uplink-downlink configuration 0, when both an MBS and an LSB of an uplink index in a PDCCH with an uplink DCI format are set to 1 in an $n^{th}$ subframe, the UE transmits the corresponding PUSCH in both an $(n+k)^{th}$ subframe and an $(n+7)^{th}$ subframe. In this case, k is defined in Table 5 above.

In a TDD system, in the case of uplink-downlink configurations 1 to 6 and a subframe bundling operation, upon detecting a PDCCH with a DCI format 0 in an $n^{th}$ subframe and/or a PHICH in an $(n-1)^{th}$ subframe, the UE transmits the corresponding first PUSCH in a bundle in an $(n+k)^{th}$ subframe according to the PDCCH and PHICH information. In this case, k is defined in Table 5 above and l is defined in Table 6 above.

In a TDD system, in the case of an uplink-downlink configuration 0 and a subframe bundling operation, upon detecting a PDCCH with a DCI format 0 in an $n^{th}$ subframe and/or a PHICH in an $(n-1)^{th}$ subframe, if an MSB of an uplink index in a DCI format 0 is set to 1 or $I_{PHICH}=0$ is satisfied, the UE transmits the corresponding first PUSCH in a bundle in an $(n+k)^{th}$ subframe according to the PDCCH and PHICH information. In this case, k is defined in Table 5 above.

In a TDD system, in the case of an uplink-downlink configuration 0 and a subframe bundling operation, when an LSB of an uplink index in a PDCCH with a DCI format 0 is set to 1 in an $n^{th}$ subframe or $I_{PHICH}=1$ is satisfied, the UE transmits the corresponding first PUSCH in a bundle in an $(n+7)^{th}$ subframe according to the PDCCH and PHICH information.

Hereinafter, a procedure for transmitting a PUCCH by a UE will be described.

HARQ processing time may vary in an FDD system and a TDD system.

In the case of an FDD system, upon detecting PDCCH transmission or a PDCCH indicating downlink semi-persistent scheduling (SPS) release in subframe(s) from an $(n-4)^{th}$ subframe, the UE transmits an HARQ-ACK/NACK response in an $n^{th}$ uplink subframe.

Table 7 below shows a downlink association set index $K(\{k_0, k_1, \ldots k_{M-1}\})$ in a TDD system for each uplink-downlink configuration.

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the case of a TDD system, upon detecting PDSCH transmission or a PDCCH indicating downlink SPS release in subframe(s) from an $(n-k)^{th}$ subframe, the UE transmits an HARQ-ACK/NACK response in an $n^{th}$ uplink subframe. Here, k∈K is satisfied and K is differently defined according to uplink-downlink configuration as shown in Table 7 above.

Hereinafter, a procedure for reporting an HARQ-ACK/NACK by a UE will be described.

Table 8 below shows a downlink assignment index.

TABLE 8

| DAI MSB, LSB | $V_{DAI}^{UL}$ or $V_{DAI}^{DL}$ | Number of subframes with PDSCH transmission and with PDCCH indicating DL SPS release |
|---|---|---|
| 0,0 | 1 | 1 or 5 or 9 |
| 0,1 | 2 | 2 or 6 |
| 1,0 | 3 | 3 or 7 |
| 1,1 | 4 | 0 or 4 or 8 |

Table 9 below shows an uplink association index K in a TDD system for each uplink-downlink configuration.

TABLE 9

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

In a TDD system, in the case of uplink-downlink configurations 1 to 6, a value of a downlink assignment index (DAI) in a DCI format 0 or 4, $V_{DAI}^{UL}$, detected by the UE in an (n−k')th subframe represents the total number of subframes for transmission of a PDSCH and a PDCCH indicating downlink SPS release to the corresponding UE in all subframe(s) from an (n−k)th subframe. Here, $V_{DAI}^{UL}$ is defined in Table 8 above and k' is defined in Table 9 above. In addition, k satisfies k∈K according to Table 7 above. The DAI value $V_{DAI}^{UL}$ includes all PDSCHs with the corresponding PDCCH and without the PDCCH in all subframes from an (n−k)th subframe. When both a PDSCH and a PDCCH indicating downlink SPS resource release are not transmitted, the UE may expect that the DAI value in a DCI format 0 or 4 is set to 4.

In a TDD system, in the case of uplink-downlink configurations 1 to 6, the DAI value in a DCI format 1/1A/1B/1D/2/2A/2B/2C denotes the accumulative number of PDCCHs for assignment of PDSCH transmission and PDCCHs indicating downlink SPS release up to a current subframe from an $(n-k)^{th}$ subframe. In this case, k satisfies k∈K according to Table 7 above. $V_{DAI}^{DL}$ represents a DAI value in a PDCCH with a DCI format 1/1A/1B/1D/2/2A/2B/2C detected by the UE in an $(n-k_m)^{th}$ subframe according to Table 8 above. Here, $k_m$ is the smallest value in the set K defined in Table 7 above and represents a subframe index for detection of a DCI format 1/1A/1B/1D/2/2A/2B/2C by the UE.

1. 3. Carrier Aggregation Environment
1. 3. 1. Overview of Carrier Aggregation

Communication environments considered in embodiments of the present invention include all multi-carrier environments. That is, a multi-carrier system or a multi-carrier aggregation system refers to a system that aggregates one or more component carriers (CCs) each having a smaller bandwidth than a target bandwidth in order to support a wideband in the present invention.

In the present invention, multi-carrier means carrier aggregation (or carrier combining). Carrier aggregation covers aggregation of non-contiguous carriers as well as aggregation of contiguous carriers. In addition, the number of CCs that are aggregated in downlink and uplink may be configured in different ways. A case in which the number of downlink CCs and the number of uplink CCs are the same is referred to as symmetric aggregation, and a case in which the number of downlink CCs and the number of uplink CCs are different is referred to as asymmetric aggregation. The term carrier aggregation is interchangeably used with bandwidth aggregation, spectrum aggregation, etc.

The LTE-A system aims to support a bandwidth of up to 100 MHz by use of multi-carriers (i.e. carrier aggregation) configured by aggregating two or more CCs. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

The LTE-A system adopts the concept of a cell to manage radio resources. The aforementioned carrier aggregation environment may refer to a multiple cell environment. A cell is defined by combining DL and UL resources, although the UL resources are not a necessity. Accordingly, a cell may be configured with DL resources alone or DL and UL resources. When a specific UE has only one configured serving cell, the cell may have one DL CC and one UL CC. When a specific UE has two or more configured serving cells, the cells may has DL CCs, the number of which is equal to the cells, and UL CCs, the number of which is equal to or less than the DL CCs. On the other hand, DL CCs and UL CCs may be configured in an opposite way. That is, when a specific UE has a plurality of configured serving cells, a carrier aggregation environment in which the number of DL CCs is more than the number of UL CCs may be supported. That is, carrier aggregation is interpreted as aggregation of plural cells having different carrier frequencies (center frequencies of the cells). Here, the term 'cell' used herein needs to be distinguished from a 'cell' as a region covered by a BS.

A cell used in the LTE-A system includes a primary cell (PCell) and a secondary cell (SCell). The PCell and the SCell may be used as serving cells. If the UE is in RRC_CONNECTED state but carrier aggregation has not been configured or is not supported in the UE, only one serving cell including a PCell exists for the UE. On the other hand, if the UE is in RRC_CONNECTED state and carrier aggregation has been configured for the UE, one or more serving cells may exist for the UE. The total serving cells include a PCell and one or more SCells.

The serving cells (the Pcell and the S cell) may be configured via an RRC parameter. PhysCellId is a physical layer ID of a cell and has an integer of 0 to 503. SCellIndex is a short ID used for identifying the S cell and has an integer of 1 to 7. ServCellIndex is a short ID for identifying the serving cell (the P cell or the S cell) and has an integer of 0 to 7. 0 is applied to the P cell and SCellIndex is pre-given so as to be applied to the S cell. That is, a cell having a smallest cell ID (or a cell index) of ServCellIndex is the P cell.

The P cell refers to a cell that operates at a primary frequency (or a primary CC). The P cell may be used to perform an initial connection establishment procedure or a connection reconfiguration procedure via a UE and refer to a cell indicated during a handover procedure. In addition, the P cell is a cell serving as a center of control-related communication among cells configured in a CA environment. That is, a UE may be allocated with a PUCCH only in a P cell of the UE and transmit the PUCCH. In addition, the UE may use only the P cell to acquire system information or change a monitoring procedure. Evolved universal terrestrial radio access (E-UTRAN) may change only the P cell for a handover procedure using an RRCConnectionReconfigutaion message of a higher layer, containing mobilityControlInfo in a UE that supports a CA environment.

The S cell may refer to a cell that operates at a secondary frequency (or a secondary CC). Only one P cell may be allocated to a specific UE and one or more S cells may be allocated to the UE. The S cell can be configured after RRC connection is established and used to supply additional radio resources. Among serving cells configured in the CA environment, a PUCCH is not present in cells except for P cells, that is, S cells. When S cells are added to the UE that supports the CA environment, the E-UTRAN may supply all system information related to an operation of a related cell in RRC_CONNECTED state through a dedicated signal. Change in the system information may be controlled according to release and addition of related S cells. In this case, an RRCConnectionReconfigutaion message of a higher layer may be used. The E-UTRAN may perform dedicated signaling with different parameters for respective UEs instead of broadcasting in related S cells. After an initial security activation procedure is initiated, the E-UTRAN may configure a network including one or more S cells in addition to a P cell that is initially configured during connection establishment. The P cell is used to provide security input and higher layer system information (e.g., mobility information of non-access-stratum (NAS) such as tracking area identity (TAI)). The S cell is used to provide additional downlink and optional uplink radio resources. The E-UTRAN may independently add, remove, or modify S cells by means of the RRC connection reconfiguration procedure using the RRCConnectionReconfigutaion message either including mobilityControlInfo or not.

Cross carrier scheduling is not applied to a P cell. That is, the P cell is always scheduled through its PDCCH. Uplink grant and downlink assignment of a cell are always scheduled from the same cell. That is, downlink is scheduled in a component carrier #2 and uplink is also scheduled in the component carrier #2. PDCCH orders are transmitted on a P cell only, and carrier indicator field (CIF) handling also applies the PDCCH orders like other uplink grant for the P cell. Medium access activation/deactivation of the S cell is maintained. Pathloss reference for an uplink component carrier (UL CC) may be configured with a downlink component carrier (DL CC) linked by system information block type 2 (SIB2) or the P cell. In addition, frame timing, system frame number (SFN) timing, and TDD configuration may be aligned in the same way over cells that can be aggregated.

In a CA environment, the P cell and the S cell may act as component carriers. In the following embodiments of the present invention, a primary component carrier (PCC) may have the same meaning as the P cell and a secondary component carrier (SCC) may have the same meaning as the S cell.

Figure 6:
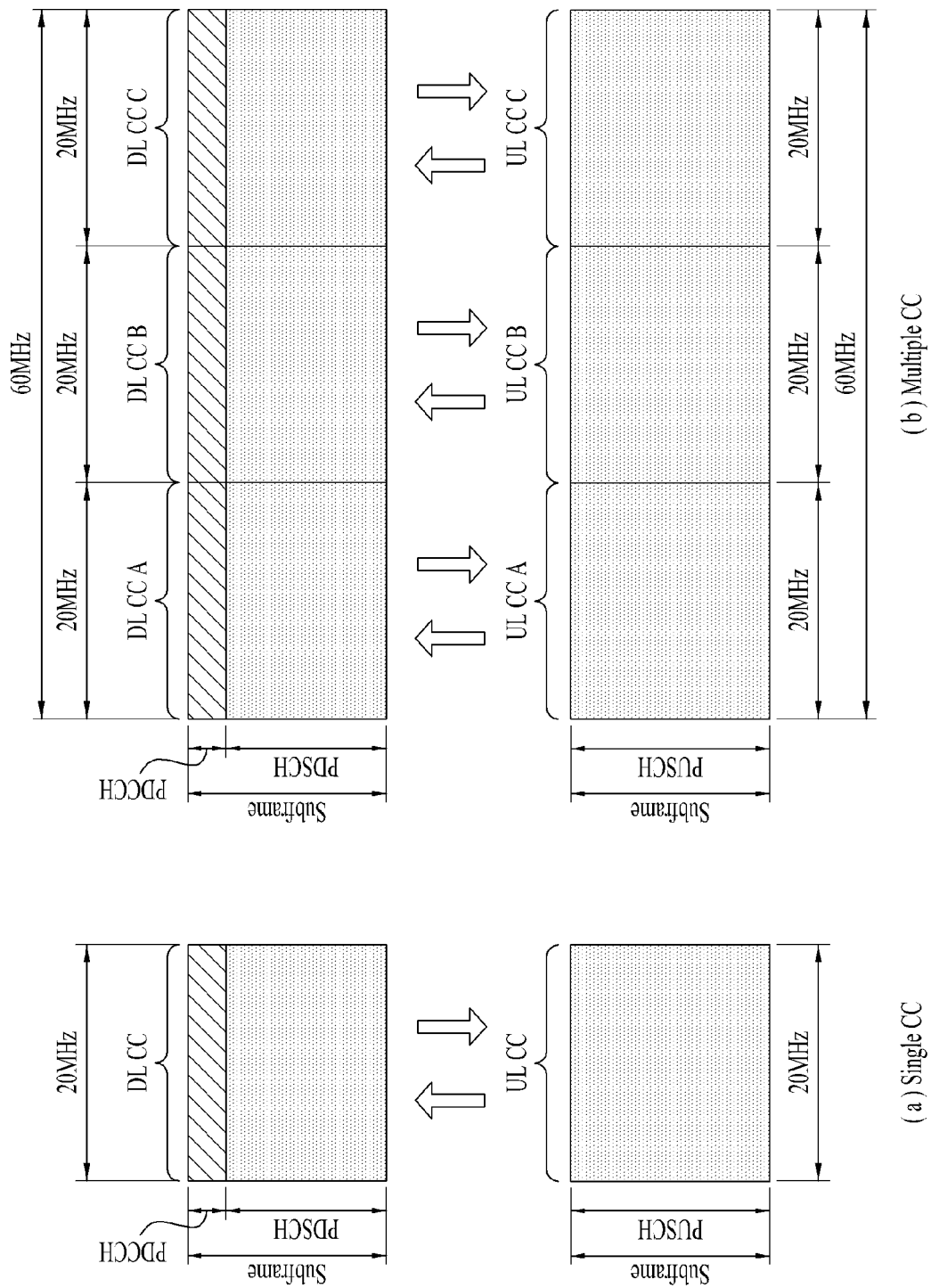
FIG. 6 is a diagram illustrating an example of a component carrier (CC) of an LET system and CA used in an LTE_A system.

FIG. 6 is a diagram illustrating an example of a component carrier (CC) of an LET system and CA used in an LTE_A system.

FIG. 6(a) illustrates a single carrier structure used in the LTE system. The CC includes a DL CC and a UL CC. One CC may have a frequency range of 20 MHz.

FIG. 6(b) illustrates a CA structure used in the LTE_A system. FIG. 10(b) illustrates a case in which three CCs with a frequency of 20 MHz are combined. Although three DL CCs and three UL CCs are illustrated, the number of the DL CCs and UL CCs are not limited. In case of CA, a UE may simultaneously monitor three CCs, receive downlink signals/data, and transmit uplink signals/data.

When N DL CCs are managed in a specific cell, a network may allocate M (M≤N) DL CCs to a UE. In this case, the UE may monitor only the M limited DL CCs and receive a DL signal. In addition, the network may apply priority L (L≤M≤N) DL CCs to allocate a primary DL CC to the UE. In this case, the UE should monitor L DL CCs. This manner may be applied to uplink transmission in the same way.

The linkage between the carrier frequency of DL resources (or a DL CC) and the carrier frequency of UL resources (or a UL CC) may be indicated by system information or a higher layer message such as an RRC message. For example, a combination of DL resources and UL resources may be configured by the linkage defined by a system information block type 2 (SIB2). In detail, the linkage may refer to a mapping relationship between DL CC for transmission of PDCCH for carrying UL grant and UL CC using the UL grant or a mapping relationship between DL CC (or UL CC) for transmission of data for HARQ and UL CC (or DL CC) for transmission of an HARQ ACK/NACK signal.

1. 3. 2. Cross Carrier Scheduling

In a CA system, from a point of view of scheduling on a serving cell or carrier, there are two methods, i.e., self-scheduling and cross carrier scheduling. The cross carrier scheduling may refer to cross component carrier scheduling or cross cell scheduling.

The self-scheduling refers to transmission of PDCCH (DL grant) and PDSCH via the same DL CC or transmission of PUSCH, transmitted on PDCCH (UL grant) transmitted via DL CC, via UL CC linked with DL CC for reception of UL grant.

The cross carrier scheduling refers to transmission of a PDCCH (DL grant) and PDSCH via different DL CCs or transmission of a PUSCH, transmitted on a PDCCH (UL grant) transmitted via a DL CC, via a UL CC that is not an UL CC linked with DL CC for reception of UL grant.

Whether to perform the cross carrier scheduling may be activated or deactivated UE-specifically or semi-statically known for each respective UE via higher layer signaling (e.g., RRC signaling).

When the cross carrier scheduling is activated, a PDCCH requires a carrier indicator field (CIF) indicating DL/UL CC for transmission of PDSCH/PUSCH indicated by the corresponding PDCCH. For example, the PDCCH may allocate PDSCH resources or PUSCH resources to one of a plurality of CCs using the CIF. That is, when the PDSCH or PUSCH resources are allocated to one of DL/UL CC via which PDCCH on DL CC is multiple-aggregated, the CIF is configured. In this case, a DCI format of LTE-A Release-8 may be extended according to the CIF. In this cast, the configured CIF may be fixed to a 3 bit field or fixed regardless of a DCI format size. In addition, a LTE-A Release-8 PDCCH structure (the same coding and same CCE-based resource mapping) may be reused.

On the other hand, when a PDCCH on a DL CC allocates PDSCH resources on the same DL CC or allocates PUSCH resources on single-linked UL CC, the CIF is not configured. In this case, the same PDCCH structure (the same coding and same CCE-based resource mapping) and the same DCI format as LTE-A Release-8 may be used.

When the cross carrier scheduling is possible, the UE needs to monitor a PDCCH of a plurality of DCIs in a control region of monitoring CC according to a transmission mode and/or bandwidth for each respective CC. Thus, PDCCH monitoring and configuration of a search space for supporting this are required.

In a multiple carrier system, a UE DL CC set is a set of DL CCs scheduled such that the UE receives a PDSCH and a UE UL CC set is a set of UL CCs scheduled such that the UE transmits a PUSCH. In addition, a PDCCH monitoring set is a set of at least one DL CC that performs the PDCCH monitoring. A PDCCH monitoring set may be the same as a UE DL CC or a subset of the UE DL CC set. The PDCCH monitoring set may include at least one of DL CCs in the UE DL CC set. Alternatively, the PDCCH monitoring set may be defined regardless of the UE DL CC set. A DL CC included in the PDCCH monitoring set may be configured such that self-scheduling with respect to UL CC linked with the DL CC is always possible. The UE DL CC set, the UE UL CC set, and the PDCCH monitoring set may be set UE-specifically, UE group-specifically, or cell-specifically.

When the cross component carrier scheduling is deactivated, the PDCCH monitoring set is always the same as the UE DL CC set. In this case, indication such as separate signaling with respect to the PDCCH monitoring set is not required. However, when the cross component carrier scheduling is activated, it is preferable that the PDCCH monitoring set is defined in the UE DL CC set. That is, in order to schedule a PDSCH or PUSCH for a UE, a BS transmits a PDCCH via the PDCCH monitoring set only.

Figure 7:
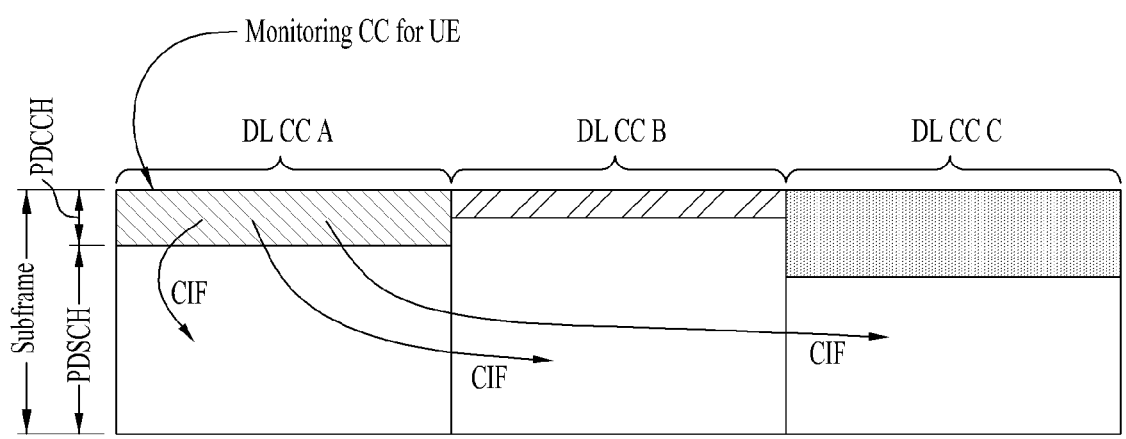
FIG. 7 illustrates a subframe structure of an LTE-A system according to cross carrier scheduling.

FIG. 7 illustrates a subframe structure of an LTE-A system according to cross carrier scheduling.

Referring to FIG. 7, a DL subframe for an LTE-A UE is formed by combining three DL CCs and a DL CC 'A' is configured as a PDCCH monitoring DL CC. When a CIF is not used, each DL CC may transmit a PDCCH for scheduling a PDSCH thereof without a CIF. On the other hand, when the CIF is used via higher layer signaling, only one DL CC 'A' may transmit a PDSCH thereof or a PDCCH for scheduling a PDSCH of another CC using a CIF. In this case, DL CCs 'B' and 'C' that are not configured as a PDCCH monitoring DL CC do not transmit PDCCH.

A UE may transmit uplink control information such as channel state information (CSI) (e.g., a channel quality indicator (CQI), ranking indication (RI), a precoding matrix indicator (PMI), etc.) and HARQ ACK/NACK that are received/detected or measured by one or more CCs to a BS on one predetermined CC. For example, when the UE transmits responses to data received from a DL CC of a P cell and a DL CC of an S cell, that is, when a plurality of ACK/NACK feedbacks is required, the UE collects (e.g., multiplexes or bundles) the plural ACK/NACKs and transmits the ACK/NACKs using one PUCCH on a UL CC in the P cell.

1. 3. 3. Intra-Band and Inter-Band

The aforementioned carrier aggregation environment may be designed in intra-band CA or inter-band CA. Here, a band in the intra-band and inter-band refers to an operating band that represents a frequency range in which E-UTRA operates (paired or unpaired).

Table 10 below shows an operating band defined in an LTE system.

TABLE 10

| E-UTRA Operating Band | Uplink (UL) operating band BS receive UE transmit $F_{UL\_low}$-$F_{UL\_high}$ | Downlink (DL) operating band BS transmit UE waive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note 1:
Band 6 is not applicable.

In intra-band CA, a plurality of DL Component Carriers (CCs) and/or UL CCs are adjacent or successive on a frequency. In other words, the carrier frequencies of a plurality of DL CCs and/or UL CCs are within the same operating band. Accordingly, intra-band CA is designed on the assumption that a plurality of CCs has similar propagation characteristics. Propagation characteristics cover various properties such as propagation delay, propagation/path loss, fading channel impact, etc. that may be affected differently according to frequencies (or center frequencies).

A UE determines an uplink transmission timing for a primary cell UL CC. Then the same uplink transmission timing for the primary cell applies as an uplink transmission timing for a secondary cell based on the aforementioned assumption (e.g. similar propagation/path delays between CCs). However, the transmission timing of a physical random access channel (PRACH) may be different. The UL subframe boundaries between cells for the UE are aligned by this operation. In this case, the UE can conduct communication in a CA environment by means of a single radio frequency (RF) end.

However, one or more cells may not be adjacent to other cell(s) in frequency in the CA environment due to problems encountered with frequency allocation (allocation of the remaining frequency, reuse of a frequency used previously for other usages, etc.) to mobile carriers for mobile communication. For example, when there are two cells in the CA environment, the carrier frequency of one cell may be 800 MHz (UL/DL) and the carrier frequency of the other cell may be 2.5 GHz (UL/DL). In another example, the carrier frequency of one cell may be 800 MHz (UL/DL) and the carrier frequency of the other cell may be 2.6 GHz (UL/DL). In a further example, the carrier frequency of one cell may be 700 MHz (UL/DL) and the carrier frequency of the other cell may be 1.7 GHz (UL)/2.1 GHz (DL). Here, a carrier frequency may be a center frequency between DL CCs or UL CCs. Such an environment in which CCs are apart from each other in frequency may be called inter-band CA. That is, carrier frequencies of a plurality of DL CCs and/or UL CCs may be positioned in different bands with different carrier frequencies. In the inter-band CA environment, the assumption that the propagation characteristics of cells are similar cannot be maintained. Therefore, the assumption that the subframe (in particular, UL) boundary is aligned between cells cannot be maintained any longer in the inter-band CA environment. Accordingly, different uplink transmission timings may be needed between the cells. In this case, the UE may use a plurality of RF ends to conduct communication in the CA environment.

2. Preamble Transmitting Method

In 3GPP LTE release-8/9/10, all UEs are designed to access and/or use all cells. However, in the future release (e.g., release-11), a cell or a carrier that only a UE having a new function (e.g., a UE having a LTE release 11 function) can access and/or use.

For example, the following carrier type may be defined and may be applied to any one of a DL carrier and an UL carrier or to both the two carriers. In addition, the following carrier may be replaced and may be used with a cell type.

1) Backward Compatible Carrier

A backward compatible carrier is a carrier accessible to UEs of all existing LTE releases. The carrier can be operated as a single carrier (stand-alone) or as a part of carrier aggregation. In an FDD system, backward compatible carriers always occur in pairs (uplink and downlink).

2) Non-Backward Compatible Carrier

A non-backward compatible carrier refers to a carrier that is not accessible to UEs of earlier LTE releases, but accessible to UEs of release defining such a carrier. The carrier can be as a single carrier (stand-alone) when the non-backward compatibility originates from a duplex distance (a frequency difference between uplink and downlink) or otherwise as a part of carrier aggregation.

3) Extension Carrier

An extension carrier refers to a carrier that cannot be operated as a single carrier (stand-alone) but needs to be a part of a component carrier set in which at least one carrier in the set is a stand-alone-capable carrier. The extension carrier may have the following features.

A PBCH, release-8 SIB, and paging may not be transmitted on the extension carrier.

A PDCCH, a PHICH, and a PCFICH may not be transmitted on the extension carrier. That is, a control region may not exist. However, an enhanced-PDCCH (e-PDCCH) may be transmitted on the extension carrier.

Mobility may be based on measurement in backward compatible CCs.

Figure 8:
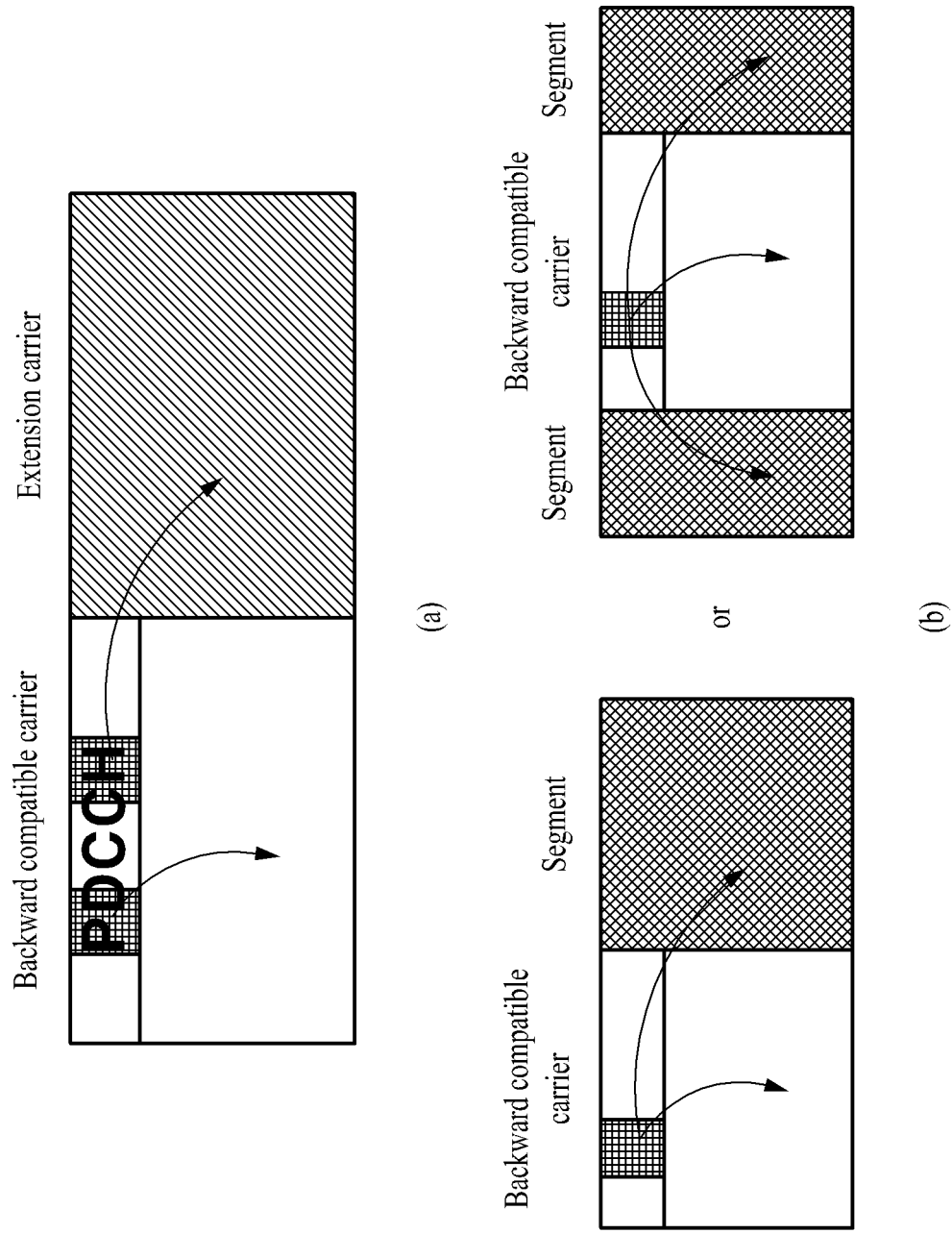
FIG. 8 is a diagram illustrating a difference between a segment and an extension carrier.

FIG. 8 is a diagram illustrating a difference between a segment and an extension carrier.

FIG. 8(a) illustrates an exemplary extension carrier and FIG. 8(b) illustrates an exemplary segment.

Referring to FIG. 8(a), in the case of the extension carrier, resource assignment of the extension carrier and a PDSCH of the backward compatible carrier is performed by each PDCCH of the backward compatible carrier.

On the other hand, as illustrated in FIG. 8(b), in the case of the segment, resource assignment of the segment and the PDSCH of the backward compatible carrier is simultaneously performed by one PDCCH of the backward compatible carrier. The segment needs to include contiguous bandwidths (BWs) to the backward compatible carrier, and a maximum BW combined with the backward compatible carrier is limited to 110 RBs. On the other hand, the extension carrier may be managed without such limiting conditions.

The extension carrier may be used for spectral efficiency enhancement or for interference mitigation. Resource assignment of the extension carrier is scheduled by a PDCCH of the backward compatible carrier, and thus, control signals of L1 (layer 1)/L2(layer 2) are not transmitted. Accordingly, since there is no control region (PDCCH, PHICH, and PCFICH), when a PDSCH is transmitted from a first OFDM symbol, and in particular, when the number of UEs is small, an assigned control region may be more effectively used to reduce overhead, thereby enhancing spectral efficiency.

Hereinafter, in the present invention, for convenience of description, carriers other than 'carriers that all UEs of LTE release can access' are collectively referred to as the extension carrier, unlike the aforementioned description.

In a wireless communication system of a cellular network, homogeneous network or heterogeneous network interference exists. The interference may affect a control channel as well as a data channel. In an LTE/LTE-A system, for interference mitigation of a data channel (PDSCH), an almost blank subframe (ABS) may be assigned such that a victim cell receives a signal without interference or frequency domains assigned to respective UEs at a cell boundary may be orthogonally assigned using scheduling information between BSs. However, since control channels PDCCH, PCFICH, and PHICH are transmitted even in a subframe assigned in an ABS, there is a limit in receiving a signal without interference by an interfered cell. Accordingly, when an extension carrier that does not transmit a control channel is configured in an ABS, the interference ell can receive a signal without interference.

The above description of the extension carrier is given when the extension carrier exists in a backward compatible carrier and intra-band, timing synchronization information about the extension carrier may be acquired using the backward compatible carrier. However, when the extension carrier exists in inter-band, the UE cannot maintain the same timing information of the corresponding extension carrier as the backward compatible carrier due to significantly different propagation delays or different RF chain delays or cannot acquire the timing information from the extension carrier. In addition, in a CoMP scenario in which radio remote heads (RRHs) having the same cell ID are arranged and a carrier aggregation scenario in which RRHs present in a macro cell have intra/inter band carrier aggregation, a time difference between CCs received by the UE may be generated.

In this regard, the following requirements may be defined.

First, signals transmitted from antenna port(s) of a BS transmitter may not be completely aligned on the time axis, and a timing difference may be generated between RF signals transmitted from antenna port(s) of the BS transmitter. In specific signals /transmitter configuration/specific set in a transmission mode, time alignment error (TAE) may be defined as a maximum timing difference between two random signals. In the case of MIMO or TX diversity transmission, time alignment error (TAE) may not exceed 65 ns at each carrier frequency. In addition, in the case of intra-band contiguous carrier aggregation to which the MIMO or Tx diversity is applied or not applied, TAE may not exceed 130 ns. In the case of inter-band carrier aggregation to which the MIMO or Tx diversity is applied or not applied, TAE may not exceed 1.3 μs.

In addition, the reception timing difference at a physical layer of DL assignments and UL grants for the same TTI but from different serving cells depending on, for example, the number of control symbols, and propagation and deployment scenario does not affect a MAC operation. The UE needs to cope with a relative propagation delay difference up to 30 μs among the component carriers aggregated in inter-band non-contiguous CA. This means that the UE needs to cope with a delay spread up to 31.3 μs among component carriers monitored at a receiver since time alignment of the BS is specified up to 1.3 μs. That is, maximum timing different of 31.3 μs may be generated between component carriers. In this case, 31.3 μs acts as a delay that occupies about 50% of a downlink OFDM symbol and exceeds the length of a CP, and thus, timing synchronization for the corresponding carrier is required.

In this case, when timing synchronization is performed using a CRS, if the CRS is transmitted to one antenna port, the CRS is assigned every six resource element (RE) in the frequency domain. When a channel is time static, a CRS assigned to an adjacent OFDM symbol is also used for timing synchronization, and thus, the CRS is assigned every 3 RE. Accordingly, when timing synchronization is performed using a CRS, an estimation range of ⅓ of OFDM symbol duration can be achieved, but a timing difference up to 50% cannot be detected. In addition, a CSI reference signal (CSI-RS) may be assigned every 12 RE and can have an estimation range of 1/12 of the OFDM symbol duration, but a timing difference up to 50% cannot be detected. Thus, the UE can perform timing synchronization using primary synchronization signal (PSS)/secondary synchronization signal (SSS) that is assigned and transmit in all predetermine frequency BWs.

In addition, in order to determine a level of a received signal and demodulate the signal, the UE performs auto gain control (AGC) for adjusting gain such that an output level is within a predetermined range. In order to perform the AGC, a reference signal for covering a system bandwidth is required, and a CRS or a CSI-RS may be used in conventional 3GPP Rel-8/9/10. Here, the PSS/SSS is transmitted to six resource blocks (RBs) by three RBs based on a center frequency of a system bandwidth, and thus, the amount of information (the amount of reference signal) is insufficient to perform the AGC. However, since it can be assumed that a CRS is not transmitted in the extension carrier, a CSI-RS is used or a new reference signal is required to perform the AGC. Needless to say, when the CRS is transmitted in the extension carrier, the AGC may be performed using the CRS.

As described above, a reference signal for covering a synchronization channel and a system bandwidth is required for the UE to perform the AGC and timing synchronization. However, it is not appropriate to transmit all reference signals to the UE for the objective of the extension carrier such as throughput enhancement, interference mitigation, etc. Hereinafter, a preamble signal (a reference signal) will be proposed to overcome the aforementioned problem.

Figure 9:
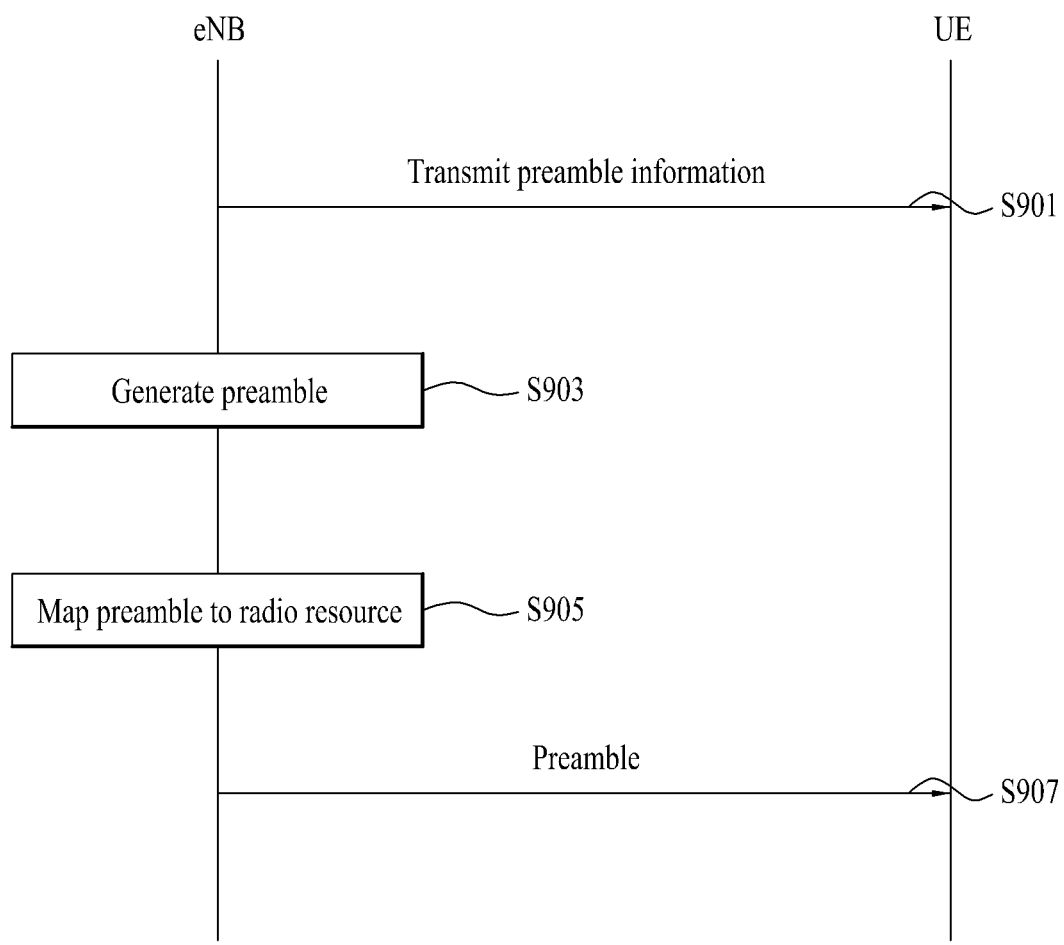
FIG. 9 is a diagram illustrating an exemplary method for transmitting a preamble signal according to an embodiment of the present invention.

FIG. 9 is a diagram illustrating an exemplary method for transmitting a preamble signal according to an embodiment of the present invention.

Referring to FIG. 9, an eNB transmits preamble signal transmission information to a UE configured with an extension carrier (S901). Here, the eNB may transmit the preamble signal transmission information through a higher layer signal. In order to receive a preamble signal through the extension carrier by the UE, the preamble signal transmission information may include information about a position of a radio resource region for transmission of a preamble, a period at which a preamble is transmitted, and/or various variables for calculation of a resource element RE to which the preamble signal is mapped. The preamble signal transmission information will be described below in detail. However, when the preamble signal transmission information is predetermined and is known to both the eNB and the UE, operation S901 may be omitted.

The eNB generates a preamble signal (sequences included in the preamble signal) (S903). Here, the preamble signal may be transmitted in a predetermined frequency band or over an entire system frequency band. In this case, during the generation of the sequence, the sequence may be generated to have the same length as the system band, or the sequence having the same length as the system band may be generated by applying cyclic repetition to a sequence having a smaller length than the system band. A method for generating a preamble sequence will be described in detail with reference to 2. 1. below.

The eNB that generates the preamble signal maps the generated preamble signal to a radio resource (S905) and then transmits the preamble signal to the UE (S907). Here, the preamble signal may be mapped to a specific OFDM symbol configured in a radio frame or may be mapped to a resource element with a specific pattern of a lattice structure. A method for mapping a preamble signal to a radio resource will be described in detail with reference to 2. 2. below.

Thus far, for convenience of description, the case in which the operation of generating and mapping the preamble signal is performed after the transmitting of the preamble transmission information has been described. However, alternatively, the operation of generating and mapping the preamble signal is performed prior to the transmitting of the preamble transmission information. That is, operations S903 and S905 may be performed prior to operation S901.

2. 1. Generation of Preamble Sequence

A BS may use Equation 1 below in order to generate a preamble sequence $r_{l,n_s}(m)$.

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{[Equation 1]}$$

$$m = 0, 1, \ldots, 2N_{RB}^{max,DL} - 1$$

In Equation 1 above, $n_s$ is the slot number within a radio frame, l is the OFDM symbol number within the slot, and $N_{RB}^{max,DL}$ is the number of resource blocks RBs corresponding to a maximum system BW. c(i) represents a pseudo-random sequence. A pseudo-random sequence generator may be initiated using $c_{init}$ at a start point of each OFDM symbol. For example, $c_{init}$ according to Equation 2 below may be used, but embodiments of the present invention are not limited thereto. $c_{init}$ may be mapped to a different value from Equation 2 below.

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad \text{[Equation 2]}$$

In Equation 2 above, $N_{ID}^{cell}$ is a physical layer cell ID and $N_{CP}$ has 1 for normal CP and has 0 for extended CP.

The length of the presumable sequence generated using this method is $2N_{RB}^{max,DL}$ and is insufficient to be mapped to all resource elements REs included in one downlink OFDM symbol. That is, since one resource block includes 12 REs in the frequency domain and the number of resource blocks included in the system bandwidth is $N_{RB}^{max,DL}$, only two REs of the 12 REs included in the one resource block in the frequency domain may be mapped. Thus, in order to map the sequence generated according to Equation 1 above to all the 12 REs included in one resource block in the frequency domain, cyclic repetition may be performed such that the length of the preamble sequence is $12N_{RB}^{DL}$. In addition, a preamble sequence may be generated according to Equation 3 below.

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 3]

$$m = 0, 1, \ldots, 12N_{RB}^{DL} - 1$$

2. 2. Mapping to Radio Resource

A method for assigning the preamble sequence generated using the method described in 2. 1. above to a radio resource will be described below.

2. 2. 1. Mapping to Specific OFDM Symbol

A BS may map a generated complex preamble signal to a specific OFDM symbol in a specific subframe in a radio frame.

Figure 10:
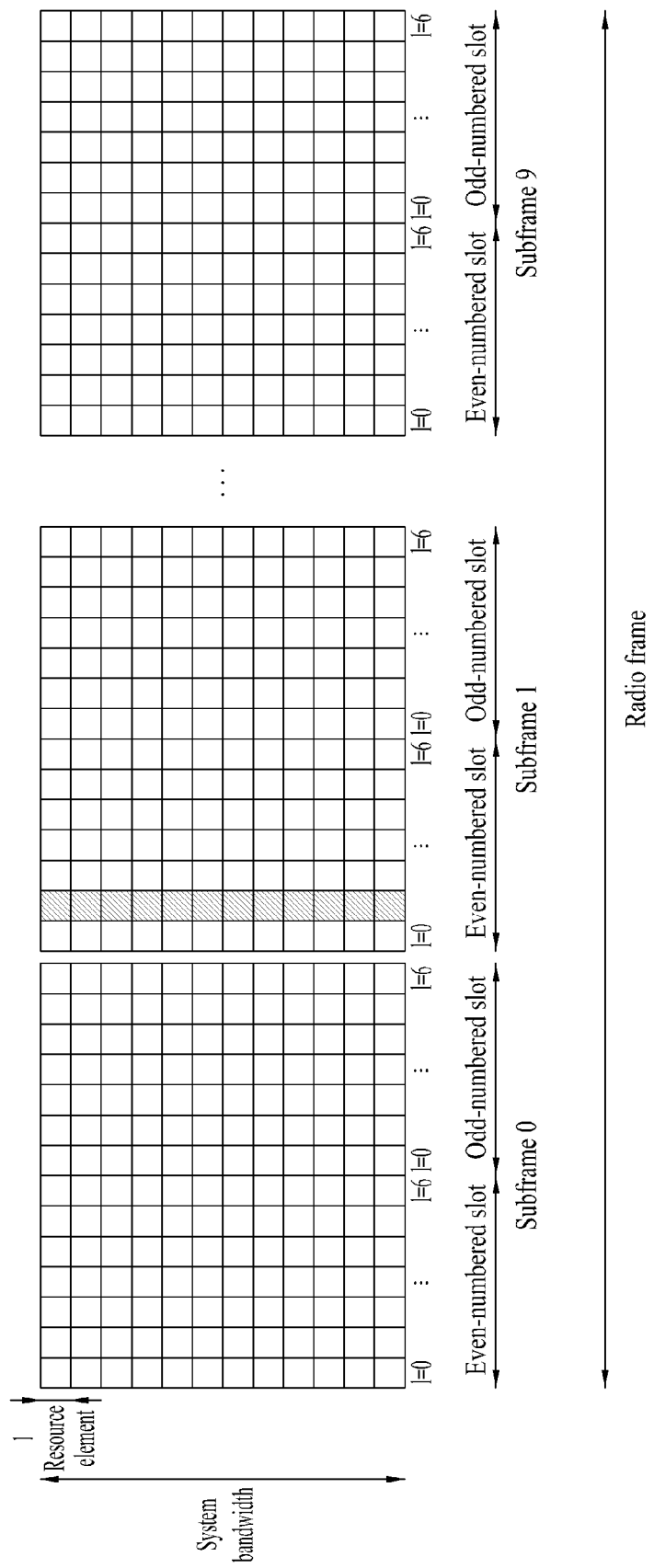
FIG. 10 illustrates an example in which a preamble is mapped to a radio resource according to an embodiment of the present invention.

FIG. 10 illustrates an example in which a preamble is mapped to a radio resource according to an embodiment of the present invention.

FIG. 10 illustrates a case in which a preamble is mapped to a second OFDM symbol (l=1) in a second subframe (a subframe #1) in a radio frame. As described above, the generated preamble sequence may have a length $12N_{RB}^{DL}$ and may be mapped to all REs included in one downlink OFDM symbol, that is, all REs included in a system bandwidth in the frequency domain.

Although FIG. 10 illustrates one OFDM in one subframe per radio frame as a radio resource to which a preamble signal is mapped, the preamble signal may be transmitted using a plurality of OFDM symbols and/or a plurality of subframes per radio frame. In addition, like in FIG. 10, a preamble signal may be transmitted per radio frame and may be transmitted at a period corresponding to a plurality of radio frames (or subframes).

Positions of an OFDM symbol and a specific subframe for transmission of a preamble signal may be configured via higher layer signaling or may be predetermined, and thus, are known to both the BS and the UE. In detail, a position (or number) of a subframe to which a preamble signal is mapped, a position (or number) of an OFDM, and/or a transmission period of a preamble signal (the number of radio frames or the number of subframes) may be configured via higher layer signaling or may be predetermined. In this case, the preamble signal may be fixed and may be statically managed in the same OFDM symbol of the same subframe every radio frame or may be configured via higher layer signaling and may be semi-statically managed. In addition, a position of a subframe and/or a position of an OFDM symbol may be determined based on cell-specific information such as a cell ID.

In a slot $n_s$ configured for transmitting a preamble signal, a preamble sequence $r_{l,n_s}(m)$ may be mapped to complex-valued modulation symbols $a_{k,l}^{(p)}$ used as preamble symbols for an antenna port p according to Equation 4 below.

$$a_{k,l}^{(p)} = r_{l,n_s}(m)$$ [Equation 4]

In Equation 4 above, a resource index pair (k, l) and m used for transmission of the preamble signal may be determined according to Equation 5 below.

$$k = 0, 1, \ldots, 12 \cdot N_{RB}^{DL} - 1$$ [Equation 5]

$$l = \begin{cases} \text{higher layer singnal or} \\ \text{pre-defined value} \end{cases}$$

$$m = 0, 1, \ldots, 12 \cdot N_{RB}^{DL} - 1$$

2. 2. 2. Lattice Structure Mapping

A BS may map the generated complex preamble signal to a lattice structure in a specific subframe in a radio frame. In this case, a mapping structure used for a positioning reference signal (PRS) may be re-used.

In a slot $n_s$ configured for transmitting a preamble signal, a preamble sequence $r_{l,n}(m)$ may be mapped to complex-valued modulation symbols $a_{k,l}^{(p)}$ used as preamble symbols for an antenna port p according to Equation 6 below.

$$a_{k,l}^{(p)} = r_{l,n_s}(m')$$ [Equation 6]

In Equation 6 above, a resource index pair (k, l), m, and m' used for transmission of the preamble signal may be determined according to Equation 7 or 8 below. Here, Equation 7 below represents normal CP and Equation 8 below represents extended CP.

$$k = 6(m + N_{RB}^{DL} - N_{RB}^{PRS}) + (6 - l + v_{shift}) \bmod 6$$ [Equation 7]

$$l = \begin{cases} 3, 5, 6 & \text{if } n_s \bmod 2 = 0 \\ & \text{if } n_s \bmod 2 = 1 \text{ and} \\ 1, 2, 3, 5, 6 & (1 \text{ or } 2 \text{ } PBCH \text{ antenna ports}) \\ & \text{if } n_s \bmod 2 = 1 \text{ and} \\ 2, 3, 5, 6 & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6$$ [Equation 8]

$$l = \begin{cases} 4, 5 & \text{if } n_s \bmod 2 = 0 \\ & \text{if } n_s \bmod 2 = 1 \text{ and} \\ 1, 2, 4, 5 & (1 \text{ or } 2 \text{ } PBCH \text{ antenna ports}) \\ & \text{if } n_s \bmod 2 = 1 \text{ and} \\ 2, 4, 5 & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

Here, the bandwidth for preamble signals and the number of resource blocks $N_{RB}^{PRS}$ are configured by higher layers. In addition, a preamble may have frequency shift $v_{shift}$ that varies according to a cell and the cell-specific shift may be determined according to Equation 9 below.

$$v_{shift} = N_{ID}^{cell} \bmod 6$$ [Equation 9]

Figure 11:
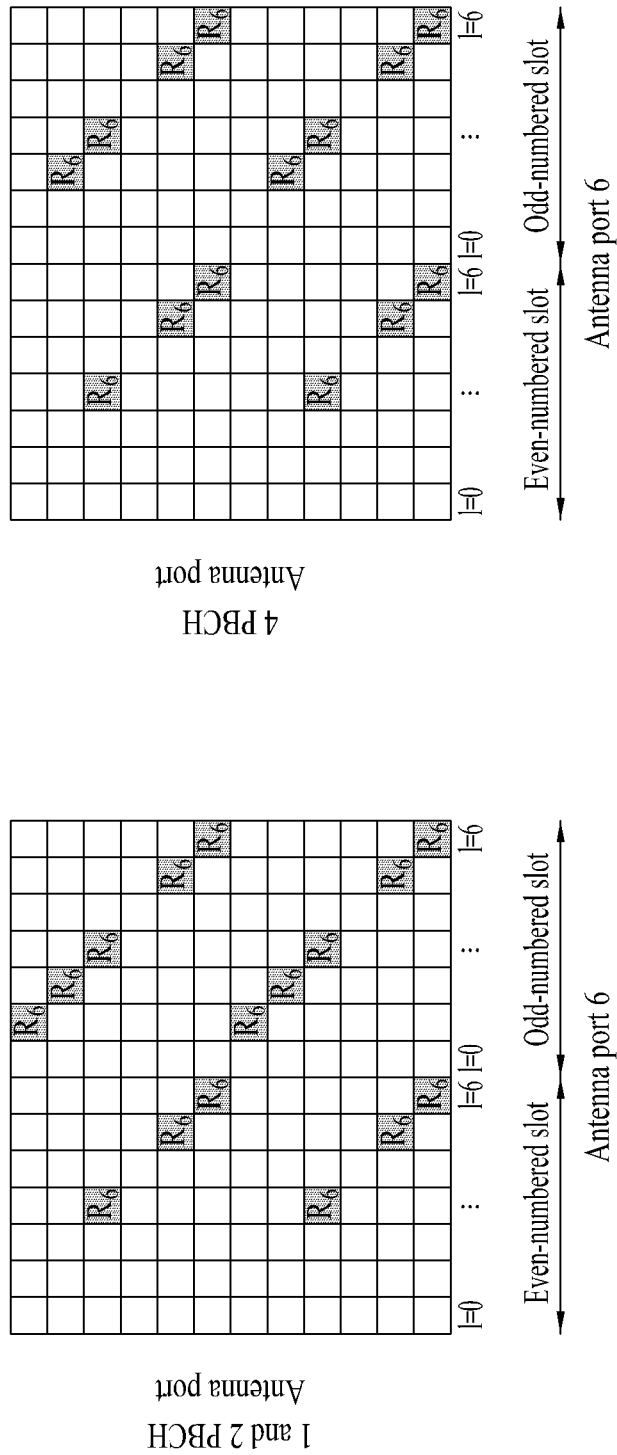
FIG. 11 illustrates an example in which a preamble is mapped to a radio resource in the case of normal cyclic prefix (CP)
Figure 12:
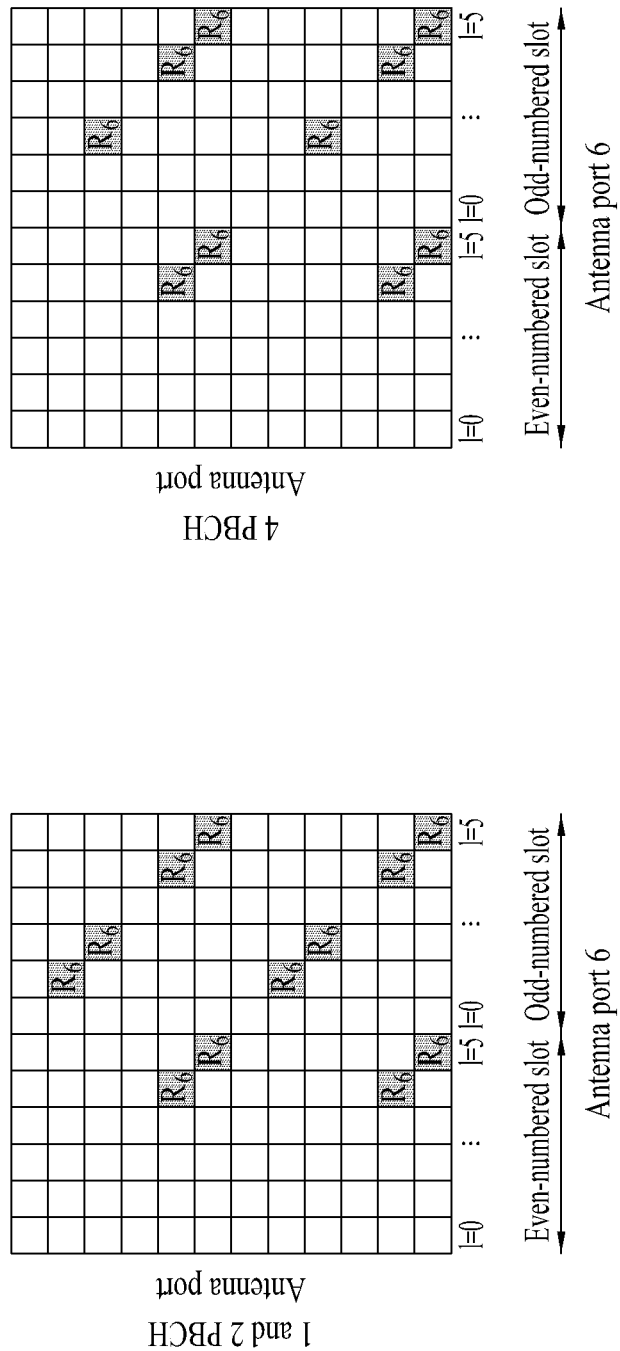
FIG. 12 illustrates an example in which a preamble is mapped to a radio resource in the case of extended CP.

When a preamble signal is mapped to a radio signal using the aforementioned method, a structure of a preamble transmitted in a specific subframe is illustrated in FIGS. 11 and 12.

FIG. 11 illustrates an example in which a preamble is mapped to a radio resource in the case of normal CP. FIG. 12 illustrates an example in which a preamble is mapped to a radio resource in the case of extended CP.

Here, a position of a specific subframe may be configured via higher layer signaling or may be predetermined.

Auto correlation performance may be enhanced using the following new rule.

A resource index pair (k, l), Δ, m, and m' used for transmission of the preamble signal may be determined according to Equation 10 below. Here, although Equation 10 below represents normal CP, Equation 10 can also be applied to extended CP, needless to say.

$$k = 6(m + N_{RB}^{DL} - N_{RB}^{PRS}) + (6 - l + \Delta + v_{shift}) \bmod 6 \quad \text{[Equation 10]}$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$\Delta = \begin{cases} 1 & \text{if } n_s \bmod 2 = 1 \text{ and } l = 5 \\ 5 & \text{if } n_s \bmod 2 = 1 \text{ and } l = 6 \\ 0 & \text{otherwise} \end{cases}$$

$$m = 0, 1, \ldots, 2 \cdot N_{RB}^{PRS} - 1$$
$$m' = m + N_{RB}^{max,DL} - N_{RB}^{PRS}$$

Referring to Equation 10 above, in a mapping structure of a positioning reference signal (PRS), preambles mapped to symbols #5 and #6 of an odd-numbered slot are shifted by 1 and 5 subcarriers in a direction in which a subcarrier index increases on a frequency axis, respectively. As described above, Equation 10 is also applied to extended CP such that the preambles mapped to symbols #5 and #6 of an odd-numbered slot are shifted by 1 and 5 subcarriers in a direction in which a subcarrier index increases on a frequency axis, respectively.

Figure 13:
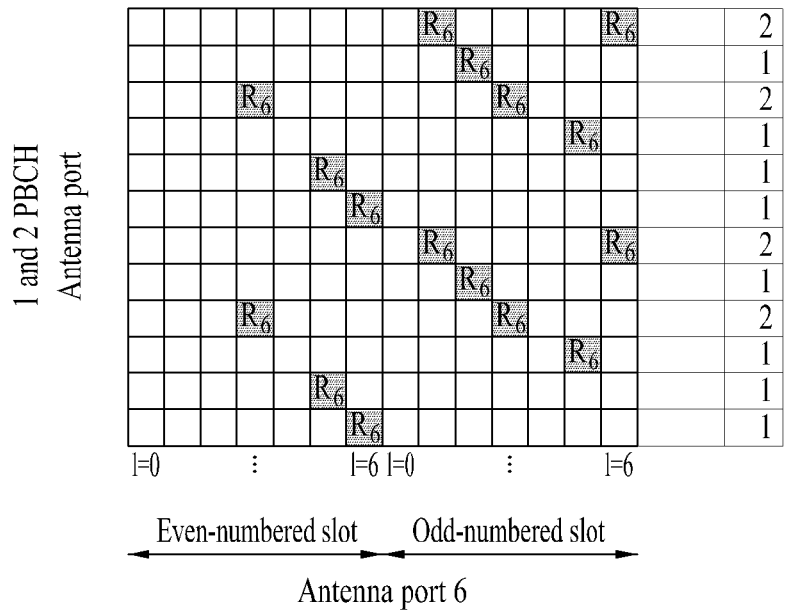
FIGS. 13 and 14 illustrate examples in which a preamble is mapped to a radio resource in the case of normal CP.
Figure 14:
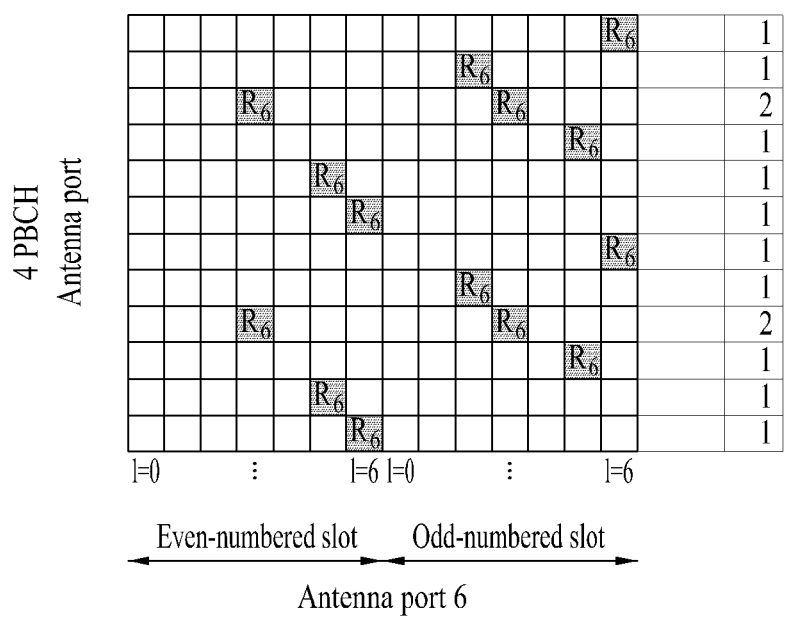

When a preamble signal is mapped to a radio resource using the aforementioned method, a structure of a preamble transmitted in a specific subframe is illustrated in FIGS. 13 and 14.

Figure 15:
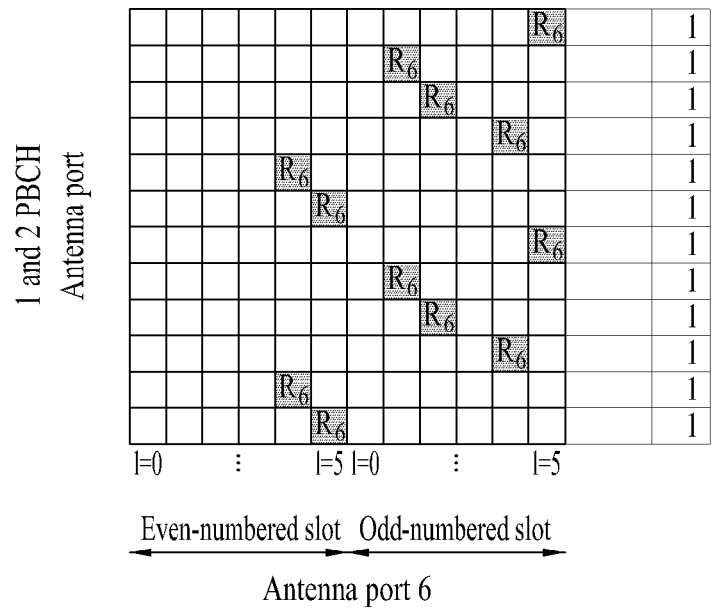
FIGS. 15 and 16 illustrate examples in which a preamble is mapped to a radio resource in the case of extended CP.
Figure 16:
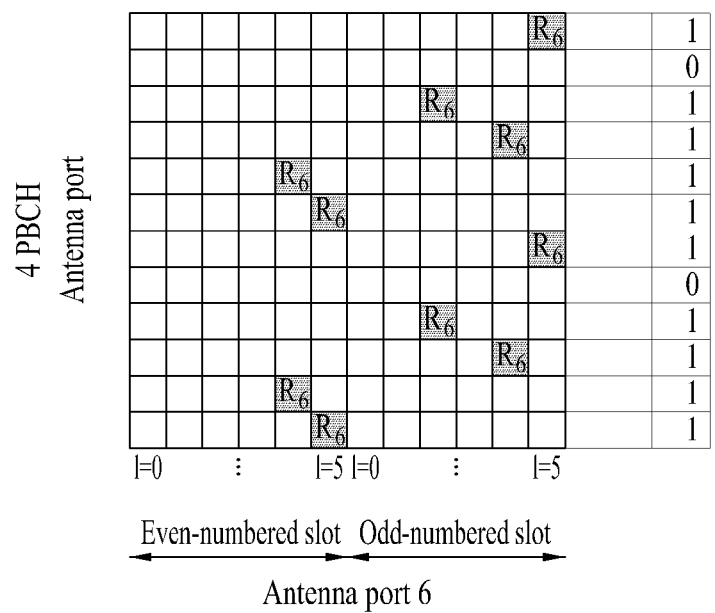

FIGS. 13 and 14 illustrate examples in which a preamble is mapped to a radio resource in the case of normal CP. FIGS. 15 and 16 illustrate examples in which a preamble is mapped to a radio resource in the case of extended CP. FIGS. 13 and 15 illustrate the case in which a preamble is transmitted on one or two antenna ports. FIGS. 14 and 16 illustrate the case in which a preamble is transmitted on four antenna ports.

FIGS. 13 and 14 illustrate mapping structures of preamble signals in a specific subframe. The number of REs to which a preamble signal is mapped on each subcarrier is indicated on the right of the preamble signal mapping structure. That is, compared with FIGS. 11 and 12, preambles are relatively uniformly mapped in the frequency domain. Thus, preamble signals are uniformly mapped in the frequency domain, thereby enhancing timing synchronization performance with respect to an extension carrier of the UE.

Here, a position of a specific subframe to which a preamble is mapped may be configured via higher layer signaling or may be predetermined 2. 3. Subframe Configuration A BS may transmit positions of a subframe and/or radio frame for transmission of a preamble to a UE via higher layer signaling. Here, the higher layer signaling may be the same as higher layer signaling used for PRS or CSI-RS transmission or may be obtained by correcting the higher layer signaling used for PRS or CSI-RS transmission.

A preamble configuration index $I_{PRS}$ represents information of a point in time for transmission of a preamble. A cell-specific subframe configuration period $T_{PRS}$ and a cell-specific subframe offset $\Delta_{PRS}$ for transmission of a preamble signal may be determined as shown in Tables 11 and 12 below.

Tables 11 and 12 below show the preamble transmission period $T_{PRS}$ and the PRS subframe offset $\Delta_{PRS}$ according to a preamble configuration index. However, the preamble configuration indexes, the preamble period, and/or the preamble subframe offset shown in Tables 11 and 12 are purely exemplary and thus may have other different values.

TABLE 11

| Preamble configuration index $I_{PRS}$ | Preamble periodicity $T_{PRS}$ (subframes) | Preamble subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

TABLE 12

| Preamble configuration index $I_{PRS}$ | Preamble periodicity $T_{PRS}$ (subframes) | Preamble subframe offset $\Delta_{PRS}$ (subframes) |
|---|---|---|
| 0-9 | 10 | $I_{PRS}$ |
| 10-29 | 20 | $I_{PRS}$-10 |
| 30-69 | 40 | $I_{PRS}$-30 |
| 70-149 | 80 | $I_{PRS}$-70 |
| 150-xxx | | Reserved |

Referring to Tables 11 and 12 above, a preamble configuration index is configured by a higher layer. Preamble signals are transmitted only in a downlink subframe. In the case of a TDD system, preamble signals may be or may not be transmitted according to configuration in a special subframe. In addition, preamble signals may be transmitted in $N_{PRS}$ consecutive downlink subframes, where $N_{PRS}$ is configured by higher layers. A first subframe among the $N_{PRS}$ consecutive subframes for transmission of preamble signals satisfies Equation 11 below.

$$(10 \times n_f + \lfloor n_s/2 \rfloor - \Delta_{PRS}) \bmod T_{PRS} = 0 \quad \text{[Equation 11]}$$

In Equation 11 above, $n_f$ represents a subframe number and $n_s$ represents a slot number.

2. 4. PDSCH Transmission

When a preamble is transmitted using the method described in 2. 2. 1. or 2. 2. 2. above, the preamble is mapped to an RE of a transmission region of a PDSCH and is transmitted. Thus, in order to transmit a PDSCH in a subframe for transmission of a preamble, the following scheme may be considered.

1) A BS may puncture a position of an RE for transmission of a preamble and transmit a PDSCH. That is, the BS may insert data transmitted through the PDSCH into an RE to which a preamble is mapped but may transmit the data at zero transmission power. In this case, the punctured RE may be expressed as mute or blank or may be expressed as transmitting a null signal in a predetermined resource element. This scheme is a scheme for most simply transmitting a PDSCH. However, a coding rate of a specific region may be increased due to puncturing to cause performance degradation.

2) A BS may rate-match data transmitted through a PDSCH by as much as the number of REs in which preambles are transmitted and transmit the data. That is, the BS may perform rate-matching in order to match a bit size of an encoded transfer block to the number of REs except for the REs in which the preambles are mapped. Unlike in the puncturing scheme, this scheme can be performed in a channel coding block and thus it is advantageous to achieve an average coding rate.

3) A preamble transmission period is not relatively frequent. Thus, transmission of a PDSCH can be prohibited in a subframe in which a preamble is transmitted. In this case of this configuration, when preambles are used in adjacent cells, inter-cell interference mitigation can be achieved.

5. Overview of Device According to an Embodiment of the Present Invention

Figure 17:
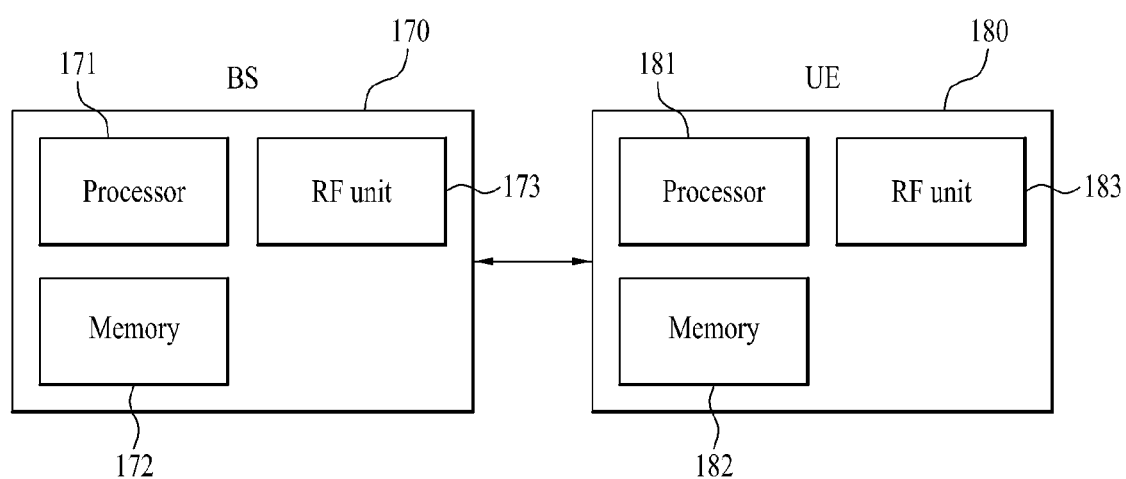
FIG. 17 is a block diagram of a communication device according to an embodiment of the present invention.

FIG. 17 is a block diagram of a communication device according to an embodiment of the present invention.

Referring to FIG. 17, a wireless communication system includes a BS 170 and a plurality of UEs 180 positioned in an area of the BS 170.

The BS 170 includes a processor 171, a memory 172, and a radio frequency (RF) unit 173. The processor 171 embodies the proposed functions, procedures, and/or methods. Layers of a wireless interface protocol may be embodied by the processor 171. The memory 172 is connected to the processor 171 and stores various information for driving the processor 171. The RF unit 173 is connected to the processor 171 and transmits and/or receives a radio signal.

The UE 180 includes a processor 181, a memory 182, and an RF unit 183. The processor 181 embodies the proposed functions, procedures, and/or methods. Layers of a wireless interface protocol may be embodied by the processor 181. The memory 182 is connected to the processor 181 and stores various information for driving the processor 181. The RF unit 183 is connected to the processor 181 and transmits and/or receives a radio signal.

The memories 172 and 182 may be inside or outside the processors 171 and 181 and connected to processors 171 and 181 via various well-known means. In addition, the BS 170 and/or the UE 180 may have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to various wireless access systems other than a 3rd generation partnership project (3GPP) long term evolution (LTE) system although the embodiments of the present invention have been described in terms of an example in which a data transmitting/receiving method is applied to the 3GPP LET system.

The invention claimed is:

1. A method for transmitting a preamble in a wireless access system for supporting carrier aggregation, the method performed by a base station and comprising:
   transmitting a higher layer signal through a backward compatible carrier, the higher layer signal including a preamble configuration index representing information of a point in time for transmission of the preamble; and
   transmitting the preamble according to the preamble configuration index to a user equipment (UE) through an extension carrier in order to synchronize timing with the backward compatible carrier,
   wherein the extension carrier does not operate as a stand-alone carrier but operates only as a part of carrier aggregation,
   wherein the preamble is generated based on a pseudo-random sequence,
   wherein a first physical downlink control channel (PDCCH) scheduling the backward compatible carrier and a second PDCCH scheduling the extension carrier are transmitted through the backward compatible carrier, and
   wherein the extension carrier does not include a physical broadcast channel (PBCH), a primary synchronization signal (PSS), a secondary synchronization signal (SSS), a cell specific reference signal (CRS), and a control channel region where control channels are transmitted.

2. The method of claim 1, wherein the preamble is mapped to one orthogonal frequency division multiplexing (OFDM) symbol in every a radio frame.

3. The method of claim 2, wherein the OFDM symbol is configured via the higher layer signaling.

4. The method of claim 2, wherein the OFDM symbol is determined based on a cell ID.

5. The method of claim 1, wherein the preamble is mapped with the same mapping structure as a mapping structure of a positioning reference signal (PRS) in a predetermined subframe in a radio frame.

6. The method of claim 5, wherein period and offset information of a subframe in which the preamble is mapped is configured via higher layer signaling.

7. The method of claim 1, wherein data transmitted to the UE is punctured at a position of a resource element to which the preamble is mapped or is rate-matched in consideration of the number of resource elements to which the preamble is mapped.

8. A method of receiving a preamble in a wireless access system for supporting carrier aggregation, the method performed by a user equipment (UE) and comprising:
   receiving a higher layer signal through a backward compatible carrier, the higher layer signal including a preamble configuration index representing information of a point in time for transmission of the preamble; and receiving the preamble according to the preamble configuration index from a base station (BS) through an extension carrier in order to synchronize timing with the backward compatible carrier, wherein the extension carrier does not operate as a standalone carrier but operates only as a part of carrier aggregation, wherein the preamble is generated based on a pseudo-random sequence, wherein a first physical downlink control channel (PDCCH) scheduling the backward compatible carrier and a second PDCCH scheduling the extension carrier are transmitted through the backward compatible carrier, and wherein the extension carrier does not include a physical broadcast channel (PBCH), a primary synchronization signal (PSS), a secondary synchronization signal (SSS), a cell specific reference signal (CRS), and a control channel region where control channels are transmitted.

9. The method of claim 8, wherein the preamble is mapped to one orthogonal frequency division multiplexing (OFDM) symbol in every a radio frame.

10. The method of claim 9, wherein the OFDM symbol is configured via the higher layer signaling.

11. The method of claim 9, wherein the OFDM symbol is determined based on a cell ID.

12. The method of claim 8, wherein the preamble is mapped with the same mapping structure as a mapping structure of a positioning reference signal (PRS) in a predetermined subframe in a radio frame.

13. The method of claim 12, wherein period and offset information of a subframe in which the preamble is mapped is configured via higher layer signaling.

14. The method of claim 8, wherein data transmitted from the BS is punctured at a position of a resource element to which the preamble is mapped or is rate-matched in consideration of the number of resource elements to which the preamble is mapped.

15. A base station (BS) for transmitting a preamble in a wireless access system for supporting carrier aggregation, the BS comprising:
a radio frequency (RF) unit; and
a processor,
wherein the processor is configured to control the RF unit to:
transmit a higher layer signal through a backward compatible carrier, the higher layer signal including a preamble configuration index representing information of a point in time for transmission of the preamble; and
transmit the preamble according to the preamble configuration index to a user equipment (UE) through an extension carrier in order to synchronize timing with the backward compatible carrier,
wherein the extension carrier does not operate as a standalone carrier but operates only as a part of carrier aggregation,
wherein the preamble is generated based on a pseudo-random sequence,
wherein a first physical downlink control channel (PDCCH) scheduling the backward compatible carrier and a second PDCCH scheduling the extension carrier are transmitted through the backward compatible carrier, and
wherein the extension carrier does not include a physical broadcast channel (PBCH), a primary synchronization signal (PSS), a secondary synchronization signal (SSS), a cell specific reference signal (CRS), and a control channel region where control channels are transmitted.

16. A user equipment (UE) for receiving a preamble in a wireless access system for supporting carrier aggregation, the UE comprising:
a radio frequency (RF) unit; and
a processor,
wherein the processor is configured to control the RF unit to:
receive a higher layer signal through a backward compatible carrier, the higher layer signal including a preamble configuration index representing information of a point in time for transmission of the preamble; and
receive the preamble according to the preamble configuration index from a base station (BS) through an extension carrier in order to synchronize timing with the backward compatible carrier;
wherein the extension carrier does not operate as a standalone carrier but operates only as a part of carrier aggregation,
wherein the preamble is generated based on a pseudo-random sequence,
wherein a first physical downlink control channel (PDCCH) scheduling the backward compatible carrier and a second PDCCH scheduling the extension carrier are transmitted through the backward compatible carrier, and
wherein the extension carrier does not include a physical broadcast channel (PBCH), a primary synchronization signal (PSS), a secondary synchronization signal (SSS), a cell specific reference signal (CRS), and a control channel region where control channels are transmitted.

* * * * *